(12) United States Patent  (10) Patent No.: US 8,352,301 B1
Starr  (45) Date of Patent: Jan. 8, 2013

(54) SALES OPPORTUNITY NOTIFICATION AND TRACKING SYSTEM AND RELATED METHODS

(75) Inventor: Jeffrey H. Starr, Walnut Creek, CA (US)

(73) Assignee: 01Click, L.L.C., Walnut Creek, CA (US)

( * ) Notice: Subject to any disclaimer, the term of this patent is extended or adjusted under 35 U.S.C. 154(b) by 0 days.

(21) Appl. No.: 13/444,761

(22) Filed: Apr. 11, 2012

(51) Int. Cl.
*G06Q 10/00* (2012.01)

(52) U.S. Cl. ............... 705/7.12; 705/7.29; 705/304

(58) Field of Classification Search ......... 705/7.12, 705/7.29, 304
See application file for complete search history.

(56) References Cited

U.S. PATENT DOCUMENTS

| | | | |
|---|---|---|---|
| 4,853,852 A | 8/1989 | Rosen | |
| 7,584,117 B2 | 9/2009 | Bubner | |
| 7,620,564 B1 * | 11/2009 | Lippock | 705/7.29 |
| 7,681,136 B2 | 3/2010 | Gennaro et al. | |
| 7,708,202 B2 | 5/2010 | Hawkins | |
| 7,797,182 B2 | 9/2010 | Lindquist et al. | |
| 7,813,959 B2 | 10/2010 | Sobotka et al. | |
| 7,949,578 B2 * | 5/2011 | Johnson et al. | 705/30 |
| 8,015,038 B2 | 9/2011 | Gennaro et al. | |
| 2002/0077998 A1 * | 6/2002 | Andrews et al. | 707/1 |
| 2003/0046136 A1 | 3/2003 | Hoffman et al. | |
| 2005/0154629 A1 | 7/2005 | Matsuda et al. | |
| 2006/0064340 A1 * | 3/2006 | Cook | 705/10 |
| 2007/0150342 A1 | 6/2007 | Law et al. | |
| 2007/0208612 A1 | 9/2007 | Storm | |
| 2007/0239514 A1 * | 10/2007 | Lissy et al. | 705/10 |
| 2008/0082399 A1 | 4/2008 | Noble et al. | |
| 2009/0043639 A1 | 2/2009 | Emens et al. | |
| 2009/0240556 A1 | 9/2009 | Angell et al. | |
| 2010/0223100 A1 | 9/2010 | Lee et al. | |
| 2011/0087516 A1 | 4/2011 | Frieden et al. | |
| 2011/0225023 A1 | 9/2011 | Evens et al. | |
| 2011/0246258 A1 | 10/2011 | Cragun et al. | |
| 2011/0251870 A1 | 10/2011 | Tavares et al. | |

* cited by examiner

*Primary Examiner* — Mark A Fleischer
(74) *Attorney, Agent, or Firm* — Adam R. Stephenson, Ltd.

(57) ABSTRACT

A sales notification system and related methods. Implementations include receiving a selection of a target industry identifier and a selection of a product identifier, where each product identifier is associated with a particular product and product category. The method includes generating a list of client accounts associated with the target industry identifier and product identifier where each client account is associated with a particular account segment, generating a list of potential sales representatives by retrieving all sales representatives associated with each client account, and generating a list of eligible sales representatives for each client account where each eligible sales representative is the potential sales representative who is permitted to sell the product associated with the product indicators within the product category and within the account segment associated with each client account. The method may also include using the server to generate a sales notification for each eligible sales representative.

20 Claims, 28 Drawing Sheets

Products

| Sales Notifications | Reports | References | Industries | Products | Client Accounts | Users |
|---|---|---|---|---|---|---|

28

| Category | Name | | |
|---|---|---|---|
| 32 | 30 — Business Process Software | Edit | Delete |
| 1 | Database Software | Edit | Delete |
| 2 | Airplane Engines | Edit | Delete |
| 5 | Glue | Edit | Delete |
| 4 | Paper | Edit | Delete |
| 2 | Automobile | Edit | Delete |
| 6 | Computer Motherboard | Edit | Delete |

FIG. 4

Products 34

| Sales Notifications | Reports | References | Industries | Products | Client Accounts | Users |

Edit Product

Category: 1 ← 36

Source: 123456

Name: Database Software (1000 site licenses) ← 38

[Add Collateral]  [Save]

FIG. 5

Client Accounts

| Sales Notifications | Reports | References | Industries | Products | Client Accounts | Users |
|---|---|---|---|---|---|---|

40

| Client Name | Industry and Parent Company | | | |
|---|---|---|---|---|
| Acme Mining | Mining, Universal Mining | View | Edit | Delete |
| Paradise Software | Software Development | View | Edit | Delete |
| Motors, Inc. | Aerospace | View | Edit | Delete |
| Acme Chemical | Adhesives and Sealants | View | Edit | Delete |
| AAA Paper | Forest Products | View | Edit | Delete |
| A+ Vehicles, Inc. | Automotive Parts | View | Edit | Delete |
| Acme Components, LTD. | Computer Hardware | | | Delete |

FIG. 6

Client Accounts

| Sales Notifications | Reports | References | Industries | Products | Client Accounts | Users |
|---|---|---|---|---|---|---|

42

Client Account

| Name | Acme Mining, Inc. |
|---|---|
| Industry | Mining |
| Account Segment | Customer |
| Revenue | 1,000,000,000 |
| Employees | 10,000 |
| Address | 123 Anywhere St., Nowhere, AZ, 99991 |

44

[ Edit Information ]    [ Save ]

FIG. 7

Users

| Sales Notifications | Reports | References | Industries | Products | Client Accounts | Users |
|---|---|---|---|---|---|---|

46

| Name | Type | Last Login | | | |
|---|---|---|---|---|---|
| John Doe | Sales Rep | 1/1/2012 15:34:32-0700 | View | Edit | Delete |
| Jane Smith | Manager | | View | Edit | Delete |
| Bob Roberts | Manager, Approver | | View | Edit | Delete |
| James Rogers | Administrator | 3/2/2012 01:01:01-0700 | View | Edit | Delete |
| Brian Smith | Sales Rep | | View | Edit | Delete |
| Adam Wright | Sales Rep | | View | Edit | Delete |
| Linda Spencer | Sales Rep | | | | |

FIG. 8

References

| Sales Notifications | Reports | References | Industries | Products | Client Accounts | Users |
|---|---|---|---|---|---|---|

48

| Client Account | Product | | |
|---|---|---|---|
| Acme Mining, Inc. | Database Software | Edit | Delete |
| Paradise Software | Database Software | Edit | Delete |
| Motors, Inc. | Airplane Engines | Edit | Delete |
| AAA Paper | Glue | Edit | Delete |
| Acme Mining, Inc. | Paper | Edit | Delete |
| Acme Chemical | Automobile | Edit | Delete |
| Acme Chemical | Computer Motherboard | Edit | Delete |

FIG. 9

References

| Sales Notifications | Reports | References | Industries | Products | Client Accounts | Users |
|---|---|---|---|---|---|---|

50

Edit Reference

| Name | Acme Mining, Inc. |
|---|---|
| Product | Database Software |
| Will Take Reference Calls | Not at this time |
| Status | Live |
| Deal Size | 1,000,000 |
| Sales Approach | Identify Challenge, Get Reference to Testify of Results |

| Collateral File | [Browse] | Sort | | Video Thumbnail Frame | 5 sec | Confidential | Yes |
|---|---|---|---|---|---|---|---|
| Name | Reference Video | | Description | | 3 min 8 sec / 12 MB mp4 | | [Remove] |

[Add Collateral]          [Save]

FIG. 10

Sales Notifications

| Sales Notifications | Reports | References | Industries | Products | Client Accounts | Users |
|---|---|---|---|---|---|---|

Database Software Sale

| Mining, Aerospace, Forest Products | Database Software | View Edit Delete |
|---|---|---|

Motors, Inc. Machinery

| Aerospace, Aircraft, Logistics | Aircraft Engines | View Edit Delete Publish |
|---|---|---|

Sales Notifications

| Sales Notifications | Reports | References | Industries | Products | Client Accounts | Users |
|---|---|---|---|---|---|---|

54

Edit Sales Notification

| | |
|---|---|
| Name | Database Software 1 and 2 |
| Originator | John Doe |
| Target Industries | Mining, Forest Products, Aerospace |
| Products | Database 1 Software, Database 2 Software |
| References | Acme Mining, Inc., Motors, Inc. |

| Product Category | 1 | Account Segment | Customer | Employees | 5000+ | Revenue | 1 million + |
|---|---|---|---|---|---|---|---|
| Why Buying? | Need data storage | Benefits | No paper chasing, data backup | Buyer | | | CEO, CIO |
| Sales Approach | Ask, how do you save information? | Propose 1st Step | Meet with IT and Business to discuss problems | Involve | | | Software Developer |

FIG. 12

Sales Notifications

| Sales Notifications | Reports | References | Industries | Products | Client Accounts | Users |
|---|---|---|---|---|---|---|

54

Edit Sales Notification

| Webinar Date and Time | January 1, 2012, 6:00 AM PST |
|---|---|
| Description | John Doe discussing how to sell Database 1 and Database 2 to internal sales reps |
| Past Webinar Recording Link | https://www.database.com/webinar    Upload File: [    ] [Browse] |
| Email Sample Subject | <Contact Name> - Interested in secure, reliable data storage? |
| Email Sample Text (variables in {{ }}) | Companies like {{reference name}} are adopting {{Sales Notification Name}} to save money and avoid data loss. |

| Collateral File | [    ] [Browse] | Sort [1] | Video Thumbnail Frame [1] | 5 sec | Confidential [Yes] |
|---|---|---|---|---|---|
| Name | Account Sales History | Description | 3 min 8 sec / 12 MB mp4 | | [Remove] |

FIG. 13

Sales Notifications 54

| Sales Notifications | Reports | References | Industries | Products | Client Accounts | Users |

Edit Sales Notification

Collateral File [ ] [Browse] Sort [ 2 ] Video Thumbnail Frame [ 5 sec ] Confidential [ No ] [Remove]

Name [ Price Sheet ] Description [ 15 page / 2.8 MB pdf ]

[ Add Collateral ]

Approvers
[ Jon Manager, Jane Smith, Ashley Wright ]

Viewers
[ John Doe, Jane Q. Public ]

Pending? [ ]

[Save] [Cancel]

FIG. 14

Reports

| Sales Notifications | Reports | References | Industries | Products | Client Accounts | Users |

<u>72</u>

Qualification Report

| Sales Rep | Received | Not Qualified | Qualified As |||||| Added to CRM ||
| | | | Already Owns | Competitor | Never ||| Later | # | $000s |
| | | | | | Already in CRM | Other | | | | |
|---|---|---|---|---|---|---|---|---|---|---|
| John Doe | 4 | 1 | 0 | 1 | 1 | 2 | 0 | 2 | $240,000 |
| Jane Public | 14 | 12 | 1 | 0 | 0 | 0 | 1 | 1 | $0 |
| Joe Smith | 20 | 20 | 0 | 0 | 0 | 0 | 0 | 0 | $0 |
| Jill Rogers | 3 | 0 | 0 | 0 | 2 | 0 | 1 | 0 | $0 |

FIG. 15

Company Settings

| Sales Notifications | Reports | References | Industries | Products | Client Accounts | Users |

56

Company Name
Sales Experts, Inc.

Account Segment
Customer, New

Product Categories
1, 2, 3, 4, 5, 6, 7, 8, 9, 10, 11, 12

Sales Representative Type
A, B, C, D

Coded Decision Matrix

{Customer : {2 : [A], 3 : [A], 4 : [A], 5 : [A], 6 : [A], 7 : [A], 8 : [A], 9 : [A], 10 : [A], 11 : [A], 12 : [A], 1 : [A]}, New : {2 : [B], 3 : [B], 4 : [B], 5 : [A, B], 6 : [A, B], 7 : [A], 8 : [A], 9 : [A], 10 : [C], 11 : [A, D], 12 : [A], 1 : [A]}}

Output Decision Matrix

|  | 1 | 2 | 3 | 4 | 5 | 6 | 7 | 8 | 9 | 10 | 11 | 12 |
|---|---|---|---|---|---|---|---|---|---|---|---|---|
| Customer | A | A | A | A | A | A | A | A | A | A | A | A |
| New | A | B | B | B | A, B | A | A | A | A | C | A, D | A |

Add Account Segment

Add Product Category

Save    Cancel

Sales Notifications (7)

Sales Notification: Database Sof[t]

Why Mining Com[...]

Benefits:

Paradise Software, Inc.
References
Deal Size: $1 million - $2 million
[ Details ]

Email    Attachments    Settings

Collateral

Database 1 Video

○
○
●

Running this Sale
<u>58</u>

John Doe, Sales Rep, Sales Experts, Inc.

Start by asking these questions:

<u>60</u>
How do you save information?

Propose this first step:

Meet with IT and business to discuss problems

Involve these people:

Software Developer

Running this Sale Webinar

[ Open ]   Tap to visit archived webinar

[ Done ]

| Company Logo | Sales Notifications (7) | Email | Settings |

94

Sales Notification: Database Software 1 and Database Software 2 for Acme Mining, Inc.

Why Mining Companies are Buying: Need Data Storage

Benefits: No paper chasing, data backup

Buyers: CEO, CIO

Collateral

Database 1 Video

How to Run This Sale

By John Doe, Sales Representative, Sales Experts, Inc.

References

Paradise Software, Inc.
Deal Size: $1 million - $2 million
Details

Motors, Inc.
Deal Size: $25k - $100k
Details

AAA Paper, Inc.
Deal Size: over $5 million
Details

FIG. 25

Company Settings 96

| Sales Notifications | Reports | References | Industries | Products | Client Accounts | Users |

Company Name

Sales Experts, Inc.

Month of First Quarter (1..12)

1

CRM Email:

CRM Manager <crm@salesexperts.com>

|  | 1 | 2 | 3 | 4 | 5 | 6 | 7 | 8 | 9 | 10 | 11 | 12 | +New |
|---|---|---|---|---|---|---|---|---|---|---|---|---|---|
| Customer | C | A, C | A | C | M | A | C | J, N | I | N | F, G | A, B, C | |
| New | A, E | A, E | B | N | H, I | A | C | J, N | B | A | A | I, J, K | |
| Premier | A, E | F, G | B | A, N | I, J | A | C | J, N | C | F | N | A, E, N | |
| +New | | | | | | | | | | | | | |

Save    Cancel

FIG. 26A

Company Settings

| Sales Notifications | Reports | References | Industries | Products | Client Accounts | Users |

Company Name
Sales Experts, Inc.

CRM Email:
CRM Manager <crm@salesexperts.com>

Month of F

Pick Sales Representatives for 12

- ● A
- ○ B
- ○ C
- ○ D
- ○ E
- ○ F
- ○ G
- ● H
- ○ I
- ○ J
- ○ K
- ○ L
- ○ M
- ○ N

[ Add Rep ]

[ Done ]   [ Cancel ]

| | 9 | 10 | 11 | 12 | |
|---|---|---|---|---|---|
| Custome | I | N | F, G | A, B, C | |
| New | B | A | A | I, J, K | |
| Premier | C | F | N | A, E, N | |
| +New | | | | | +New |

Sales Notifications By Account  98

| Sales Notifications | Reports | References | Industries | Products | Client Accounts | Users |
|---|---|---|---|---|---|---|

Database SW: Change Sales Rep/Company Contact

Rep Q     [Add Rep]

CEO B     [Add Contact]

[Done]

| | Database SW | Aircraft Engines | Motherboards | Bond Paper | VIP Taxi Service |
|---|---|---|---|---|---|
| Acme Mining | Rep A, CIO X | Rep D, CIO X | Rep G, CIO X | Rep P, CIO X | Rep Q, Owner |
| Brand X | Rep B, CIO Q | Rep E, CIO Z | | Rep A, Admin | |
| Cost Cut | | Rep F, CIO AA | Rep T, CEO A | Rep C, COO T | Rep S, Janitor |

[Save]   [Cancel]

FIG. 27

SALES OPPORTUNITY NOTIFICATION AND TRACKING SYSTEM AND RELATED METHODS

BACKGROUND

1. Technical Field

Aspects of this document relate generally to systems and methods utilized to sell products and services.

2. Background Art

Many different systems and methods have been devised to assist sales representatives in selling products and services to prospective customers and clients. Some conventional systems involve computing systems which generally aid in functions such as contact information storage, sales forecasting, and product information storage. Many tangible articles, or collateral, in the form of pamphlets, brochures, portfolios, whitepapers, and books are used in many sales forces to provide information about a specific product or benefits received by a particular customer. A wide variety of conventional methodologies exist that are employed by various sales representatives in many industries, including aerospace, automotive, chemical, and software to qualify and sell to prospective customers.

SUMMARY

Implementations of sales opportunity notification (sales notification) systems may utilize implementations of a method of notifying a sales representative of a sales opportunity or potential sales opportunity. The method may include receiving a selection of one or more target industry identifiers from a plurality of target industry identifiers included in a target industry database and receiving a selection of one or more product identifiers from a plurality of product identifiers contained in a product database, where each of the one or more product identifiers is associated with a particular product and with a particular product category. The method may also include generating a list of client accounts associated with the selected one or more target industry identifiers and the selected one or more product identifiers from a client account database using the server which is operatively coupled with the target industry database, the product database, and a client account database where each client account in the client account database is associated with a particular account segment. The method may include generating a list of potential sales representatives using the list of client accounts and a sales representative database by retrieving all sales representatives associated with each client account in the list of client accounts from the sales representative database using the server. The method may also include using the server to generate a list of eligible sales representatives for each client account from the list of potential sales representatives where each eligible sales representative is the potential sales representative who is determined to be permitted to sell the product associated with the selected one or more product indicators within the product category associated with the selected one or more product indicators and within the account segment associated with each client account. The method may also include using the server to generate a sales notification for each eligible sales representative in the list of eligible sales representatives and sending the sales notification for each eligible sales representative into a telecommunication channel using the server where each sales notification is configured to be received from the telecommunication channel by a mobile computing device associated with each eligible sales representative and the mobile computing device is configured to generate a notification on the screen of the mobile computing device using information included in the sales notification.

Implementations of the method may include one, all, or any of the following:

The method may include generating an approval notification using the server where the approval notification contains information relating to the sales notification, sending the approval notification into the telecommunication channel where the approval notification is configured to be received from the telecommunication channel by a mobile computing device associated with an approver. The mobile computing device may be configured to generate a notification on the screen of the mobile computing device in response to receiving the approval notification, display information relating to the sales notification on the screen of the mobile computing device, generate a return approval notification using the mobile computing device in response to the approver indicating an approval of the sales notification or a rejection of the sales notification, and sending the return approval notification into the telecommunication channel where the return approval notification is configured to be received from the telecommunication channel by the server. The method may further include recording the approval or rejection of the sales notification using the server in response to receipt of the return approval notification.

The method may further include selecting one or more qualification options associated with the sales notification sent to each eligible sales representative using the mobile computing device, generating one or more responses to each sales notification after selecting the one or more qualification options using the mobile computing device, sending the one or more responses into the telecommunication channel using the mobile computing device, and receiving the one or more responses from the telecommunication channel using the server.

Selecting one or more qualification options by the eligible sales representative may further include where the one or more responses are one of a removal response including information regarding the client account associated with the sales notification indicating a reason why the client account does not qualify for a sale of the product associated with the sales notification, a reminder response including a time period when the sales notification should again be transmitted to the eligible sales representative for qualification, or a sales information communication response including information relating to a sale of the product forecasted by the eligible sales representative who received the sales notification.

The method may further include storing one or more responses to each sales notification in a response database and generating a report using the server and the response database wherein the report may include a total number of sales notifications provided to a sales representative, a number of responses received from the sales representative, a number of removal responses received from the sales representative, a number of reminder responses received from the sales representative, and the number of sales information communication responses received from the sales representative.

Generating a sales notification for each eligible sales representative may further include where the sales notification includes information regarding the client account and the product associated with the one or more product indicators selected.

Generating a sales notification for each eligible sales representative may further include where the sales notification includes identifying information of a sales representative who has completed a sale of the product to a client account, information in computer readable form relating to one or more references, sales collateral included in computer readable form, information relating to a webinar being held by the sales representative who completed the sale, information regarding a strategy for use by the eligible sales representative to sell to the client account associated with the sales notification, and content in computer readable form for generating one or more emails for sending to the client account using the mobile computing device associated with the eligible sales representative. The one or more emails may be configured to include one of one or more hyperlinks to one or more locations of the sales collateral in computer readable form on the server, one or more hyperlinks to the information in computer readable form relating to the one or more references, and any combination thereof.

Generating the list of eligible sales representatives for each client account from the list of potential sales representatives where each eligible sales representative is the potential sales representative who is determined to be permitted to sell the product may further include using a decision matrix formed from values of the product categories associated with the one or more product indicators and values of the account segment associated with the client accounts in the list of client accounts and the server to make the decision for each potential sales representative.

Generating the list of eligible sales representatives for each client account from the list of potential sales representatives where each eligible sales representative is the potential sales representative who is determined to be permitted to sell the product may further include generating a decision matrix by mapping values of the product categories associated with the one or more product indicators to values of the account segment associated with each client account in the list of client accounts. The method may further include assigning to each mapped combination of product category values and account segment values a value of an eligible sales representative type allowed to sell the product for that mapped combination. The method may further include using the server to compare a value of an eligible sales representative type associated with each potential sales representative in the list of potential sales representatives with a value of the eligible sales representative type assigned to each mapped combination and, where the value of the eligible sales representative type associated with a potential sales representative corresponds with the value of the eligible sales representative type assigned to a mapped combination, adding the potential sales representative to the list of eligible sales representatives.

Implementations of sales opportunity notification systems may utilize implementations of a method of notifying a sales representative of a sales opportunity. The method may include storing one or more target industry identifiers in a target industry database using a server, storing one or more product identifiers for one or more products in a product database using the server where the one or more product identifiers are associated with a particular product, a product category, and a collateral association configured to permit access by the server to sales collateral included in computer readable form related to the particular product. The method may further include storing a plurality of client accounts in a client account database using the server where each client account is associated with an account segment and includes client identifying information including one of a number of employees, a relationship code, a yearly revenue, or any combination thereof. The method may include storing a plurality of references in a references database using the server where each reference is associated with a particular product and includes information regarding a completed sale of the product to a particular client account including an amount of the sale, identifying information of the reference, a reference association configured to permit access by the server to reference collateral included in computer readable form relating to the particular reference, or any combination thereof. The method may further include generating a sales notification by receiving a selection of one or more target industry identifiers by a user from the plurality of target industry identifiers included in the target industry database, receiving a selection of one or more product identifiers from the plurality of product identifiers included in the product database by the user, generating a list of client accounts associated with the selected one or more target industry identifiers and the selected one or more product identifiers from the client account database using the server operatively coupled with the target industry database, the product database, and the client account database. The method may further include generating a list of potential sales representatives using the list of client accounts and a sales representative database coupled to the server by retrieving all sales representatives associated with each client account in the list of client accounts from the sales representative database and, using the server, generating a list of eligible sales representatives for each client account from the list of potential sales representatives where each eligible sales representative is the potential sales representative who is determined to be permitted to sell the product associated with the selected one or more product indicators within the product category associated with the selected one or more product indictors and within the account segment associated with each client account. The method may further include receiving a selection of one or more references by the user from the plurality of references included in the references database and, for each client account, configuring the sales notification to include information relating to the one or more product identifiers selected, the one or more references selected, and the client account. The method may also include using the server to send a sales notification for each eligible sales representative into a telecommunication channel where each sales notification is configured to be received from the telecommunication channel by a mobile computing device associated with each eligible sales representative. The mobile computing device may be configured to generate a notification on the screen of the mobile computing device using information included in the sales notification in response to receiving the sales notification.

The method may include one, any, or all of the following:

Generating an approval notification using the server where the approval notification includes information relating to the sales notification. The method may also include sending the approval notification into the telecommunication channel where the approval notification is configured to be received from the telecommunication channel by a mobile computing device associated with an approver. The mobile computing device may be configured to generate a notification on the screen of the mobile computing device in response to receiving the approval notification, displaying information relating to the sales notification on the screen of the mobile computing device, generating a return approval notification using the mobile computing device in response to the approver indicating an approval or rejection of the sales notification, and sending the return approval notification into the telecommunications channel. The return approval notification may be configured to be received from the telecommunication channel by the server. The method may further include recording the approval or rejection of the sales notification using the server in response to receipt of the return approval notification where recording the approval of the sales notification occurs prior to sending a sales notification for each eligible sales representative into a telecommunication channel.

The method may further include selecting one or more qualification options associated with the sales notification sent to each eligible sales representative using the mobile computing device, generating one or more responses to each sales notification after selecting the one or more qualification options using the mobile computing device, sending the one or more responses into the telecommunication channel using the mobile computing device, and receiving the one or more responses from the telecommunication channel using the server.

Selecting one or more qualification options by the eligible sales representative may further include where the one or more responses are one of a removal response including information regarding the client account associated with the sales notification indicating a reason why the client account does not qualify for a sale of the product associated with the sales notification, a reminder response including a time period when the sales notification should again be transmitted to the eligible sales representative for qualification, or a sales information communication response including information relating to a sale of the product completed by the eligible sales representative who received the sales notification.

The method may further include storing one or more responses to each sales notification in a response database and generating a report using the server and the response database where the report includes a total number of sales notifications provided to a sales representative, a number of responses received from the sales representative, a number of removal responses received from the sales representative, a number of reminder responses received from the sales representative, and the number of sales information communication responses received from the sales representative.

Implementations of sales opportunity notification (sales notification) systems may utilize implementations of a method of qualifying sales opportunities from a sales notification. The method may include receiving a sales notification from a telecommunication channel using a mobile computing device associated with an eligible sales representative, generating a notification on the screen of the mobile computing device using information included in the sales notification in response to receiving the sales notification, and in response to activating the notification, displaying an interface on the screen of the mobile computing device. The interface may be configured to include identifying information of a sales representative who has completed a sale of a product to a client account, information in computer readable form relating to one or more references, and sales collateral included in computer readable form. The method may also include selecting one or more qualification options included in the interface on the screen associated with the sales notification sent to the eligible sales representative using the mobile computing device, generating one or more responses to the sales notification after selecting the one or more qualification options using the mobile computing device, sending the one or more responses into the telecommunication channel using the mobile computing device, and receiving the one or more responses from the telecommunication channel using a server coupled with the mobile computing device through the telecommunication channel.

Implementations of the method may include one, all, or any of the following:

Displaying the interface on the screen of the mobile computing device may be further configured to include displaying information relating to a webinar being held by the sales representative who completed the sale, information regarding a strategy for use by the eligible sales representative to qualify the client account associated with the sales notification, and content in computer readable form for generating one or more emails for sending to the client account using the mobile computing device associated with the eligible sales representative. The one or more emails may be configured to include one of one or more hyperlinks to one or more locations of the sales collateral in computer readable form on the server, one or more hyperlinks to the information in computer readable form relating to one the one or more references, or any combination thereof.

The method may further include downloading the information in computer readable form relating to the one or more references, the sales collateral, and the content in computer readable form for generating one or more emails, from the server across the telecommunication channel using the mobile computing device.

The method may further include altering one of the information in computer readable form relating to the one or more references, the sales collateral, the content in computer readable form for generating one or more emails, or any combination thereof which are stored on the server, generating an alteration notification using the server and sending the alteration notification into the telecommunication channel. The method may further include receiving the alteration notification from the telecommunication channel using the mobile computing device, generating a redownload notification on the screen of the mobile computing device in response to receiving the alteration notification, redownloading any one of the altered information in computer readable form relating to the one or more references, the sales collateral, the content in computer readable form for generating one or more emails, or any combination thereof which are stored on the server in response to the eligible sales representative activating the redownload notification on the screen.

Selecting the one or more qualification options included in the interface on the screen associated with the sales notification may further include where the one or more responses are one of a removal response including information regarding the client account associated with the sales notification indicating a reason why the client account does not qualify for a sale of the product associated with the sales notification, a reminder response including a time period when the sales notification should again be transmitted to the eligible sales representative for qualification, or a sales information communication response including information relating to a sale of the product completed by the eligible sales representative who received the sales notification.

The method may further include storing one or more response to the sales notification in a response database on the server and generating a report using the server and the response database and displaying the report to a user on a computer terminal coupled to the server where the report includes a total number of sales notification provided to a sales representative, a number of responses received from the sales representative, a number of removal responses received from the sales representative, a number of reminder responses received from the sales representative, and the number of sales information communication responses received from the sales representative.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 4 is a view of a products summary page;

FIG. 5 is a view of a product editing page;

FIG. 6 is a view of a client accounts summary page;

FIG. 7 is a view of a client account editing page;

FIG. 8 is a view of a users summary page;

FIG. 9 is a view of a references summary page;

FIG. 10 is a view of a reference editing page;

FIG. 11 is a view of a sales notifications summary page;

FIG. 12 is a view of a first portion of a sales notification editing page;

FIG. 13 is a view of a second portion of a sales notification editing page;

FIG. 14 is a view of a third portion of a sales notification editing page;

FIG. 15 is a view of a reports page illustrating an implementation of a sales qualification report;

FIG. 16 is a view of a company settings page;

FIG. 17 is a view of an implementation of a computer interface on a screen of a mobile computing device;

FIG. 18 is a view of a window including an implementation of how to run a sale for the sales notification implementation displayed on the screen;

FIG. 22 is a view of a window illustrating a summary of sales notifications received and a window containing options for selection to communicate a reason for removal of the sales notification from the eligible sales representative's list of received sales notifications;

FIG. 23 is a view of an implementation of a redownload notification;

FIG. 25 is a view of an interface page configured for display in a web browser;

FIG. 26A is a view of another implementation of a company settings page;

FIG. 26B is a view of the implementation of a company settings page of FIG. 26A with a window displaying information regarding sales representative selection;

FIG. 27 is a view of an implementation of a sales notifications by account report page.

DESCRIPTION

This disclosure, its aspects and implementations, are not limited to the specific components or assembly procedures disclosed herein. Many additional components and assembly procedures known in the art consistent with the intended sales opportunity notification system and/or assembly procedures for a sales opportunity notification system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such sales opportunity notification systems and implementing components, consistent with the intended operation.

Figure 1:
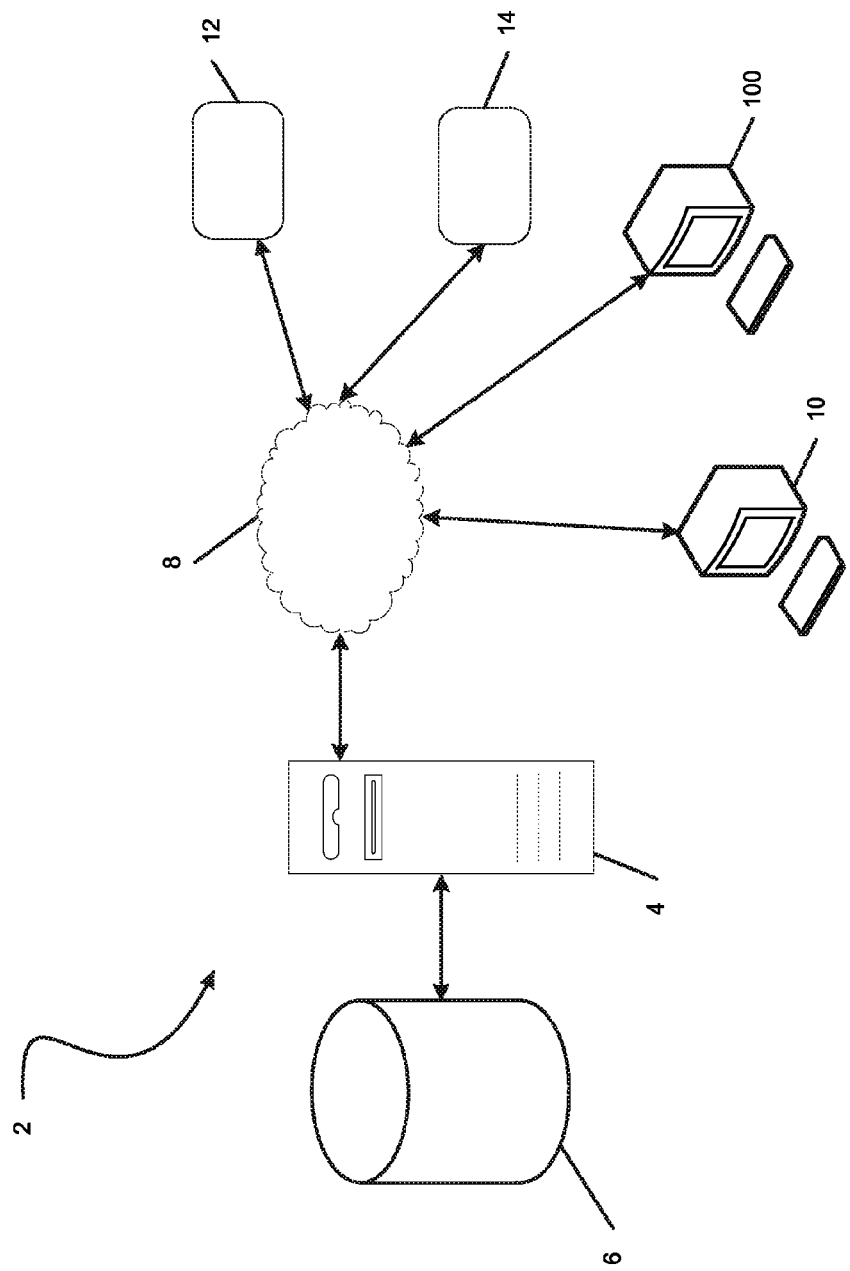
FIG. 1 is a block diagram of an implementation of a sales notification system.

Referring to FIG. 1, an implementation of a sales opportunity notification system (sales notification system) 2 is illustrated. As illustrated, the system 2 includes a server 4 operatively coupled to one or more databases 6. The server 4 may be a single physical server, multiple physical servers, a virtualized server operating in association with one or more other virtual servers on a single physical server, multiple virtual servers, or any combination thereof. The databases 6 may reside physically on the server 4 or may be included in one or more other server computers coupled to the server 4 which may be configured like any disclosed in this document. Any number of email servers, database servers, web servers, application servers, and the like may be included in implementations of the system 2 to perform the various networking, application, and communication functions implemented on the system 2. As illustrated, the server 4 is coupled to a telecommunication channel 8 which may be, by non-limiting example, the internet, a wide area network (WAN), a local area network (LAN), a telephone network, an Ethernet network, a digital subscriber line (DSL) network, a coaxial cable network, a wireless network, a cellular telephone network, satellite communication network, or any other system or structure adapted to permit wired or wireless communication of information between two devices.

As illustrated, a client computer 10 is coupled to the telecommunication channel 8 and is configured to communicate with the server 4 through the channel 8. The client computer 10 may be any computing system, including, by non-limiting example, a desktop computer, a laptop computer, a notebook computer, a tablet computer, a smart phone, a cellular telephone, or any other microprocessor controlled computing device. Mobile computing devices 12, 14 are also coupled to the server 4 through the telecommunication channel 8. In particular implementations, the mobile computing devices 12, 14 are tablet computing devices marketed under the tradename IPAD® by Apple of Cupertino, Calif. Any of a wide variety of mobile computing devices may be utilized in various implementations of the system 2, including, by non-limiting example, cellular phones, smart phones, tablet computing devices, laptops, notebook computers, music players, and any other microprocessor controlled portable computing device.

The various method implementations disclosed herein may be carried out by software instructions included in computer readable media associated with the server 4, database 6, client computer 10, mobile computing devices 12, 14, and components associated with telecommunications channel 8. In a particular implementation, the server 4 may utilize Linux as an operating system, Unicorn for web applications, nginx to provide web server services, Ruby on Rails may be utilized for the programming of server-side portions of the system 2 with background notifications being sent by and tracked using Resque. The database 6 may operate using PostgreSQL. Implementations of mobile computing devices 12 and 14 may operate using iOS developed by Apple, of Cupertino, Calif. and programming of applications operating on the mobile computing devices 12, 14 may be done in Objective C and Cocoa Touch. Communication protocols employed in implementations of the system 2 may include JSON (JavaScript Object Notation). In particular implementations, the Ruby on Rails code interacts with the database 6 to obtain data and generate notifications (sales notifications and others disclosed herein) which are sent to Resque where they are queued for delivery (push notifications) via nginx across the telecommunications channel 8 to the mobile computing devices 12, 14. Secure socket layer (SSL) certificates may be used to ensure that communications across the telecommunications channel 8 are secured via encryption.

Implementations of the sales notification system 2 may be utilized to implement various methods of notifying sales representatives of the existence of a sales opportunity or potential sales opportunity. A sales opportunity or potential sales opportunity may occur or exist when a customer or client of a particular company buys a particular product. Where the company has customers or potential customers who are in the same or similar industries as the company that bought the product or have similar needs or characteristics, a sales representative has an opportunity to approach the other customers to see if they too may purchase the product or service. Because a sale of a product may be the result of market forces, technological changes, exposure marketing campaigns, new product features, or failures by competitors, a sale of a product or service to one customer may signal the opening of a door to sell to many existing or prospective customers in the same industry who often have similar assets and/or business processes and/or who have the same needs. Companies located in similar but not identical industries often have related needs which can be met by similar products (i.e., chemical, oil and gas, and mining industries). Being able to quickly organize and coordinate the efforts of sales representatives to focus on qualifying all existing or potential customers who are identified as being potentially likely to purchase a particular product or service recently sold to customers in similar industries or with similar needs may permit a company to capitalize on the reasons for the sale. In particular implementations, providing the sales representatives with the details of how the original sale was accomplished by using the system or in house coaching coordinated via the system may permit the quick sharing of key learnings, best known methods, product details, key customer concerns and their resolution, the identification of key personnel within the company who can help successfully engage a prospective customer's concerns, reference information to show the prospective customer regarding why the original product was purchased, and many other tools and information needed by sales representatives to best work to qualify potential customers. Where the potential customer has already purchased products or services from the company, the sales representative may be already familiar with the potential customer, but may lack specific knowledge about the product or sales approach needed to use with the potential customer; in situations where the company or individual is a new contact, the sales notification system may give the sales representative the ability to get in the door by having return on investment information from a similar company immediately available. Where sales representatives may have tens, hundreds, or thousands of different items or products they are responsible to sell, the ability to quickly communicate and have relevant information about each product at hand may be very helpful to the sales representative and increase his or her sales effectiveness. Because of the sharing of key learnings, the group of sales representatives within the company as a whole may be able to improve their skills and information more uniformly, thereby enabling the company to accomplish more consistent and rapid sales of a given product to all companies who can derive value from the product or products.

Figure 2:
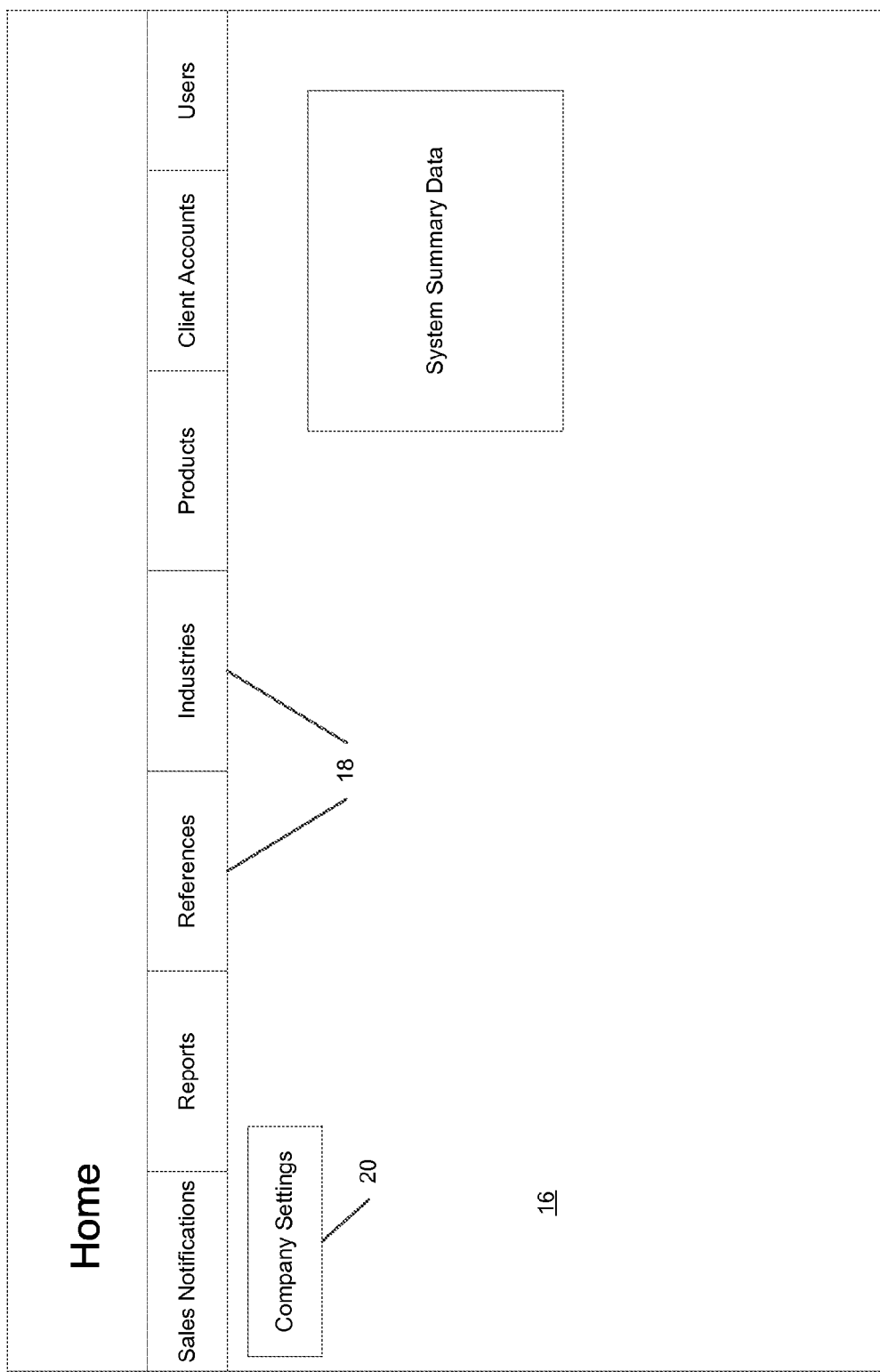
FIG. 2 is a view of a web page illustrating a home page of an implementation of a sales notification system.

In particular implementations, the client computer 10 may communicate with the server 4 over telecommunication channel 8 to enable a user to store and make various selections of information stored in databases 6. The user may do this in a variety of ways, using many possible implementations of user interfaces to do so. Where the server 4 is a web server, the user may utilize a web browser interface to perform the various storage and selection steps employed in various methods of notifying sales representatives of a sales opportunity. Referring to FIG. 2, an implementation of a web browser interface (web page) for a home page 16 of an implementation of a sales notification system 2 is illustrated. As illustrated, the home page 16 includes various links or tabs 18 permitting the user to open additional pages that permit the user to view, store, select, and otherwise manipulate data included in various databases, including a references database, a target industries database, a product database, a client account database, a sales representatives database, and any other database involved in storage of information relating to the system. As illustrated, the home page 16 may include a link to a company settings page 20 and a location for summarizing data relating to the system.

Figure 3:
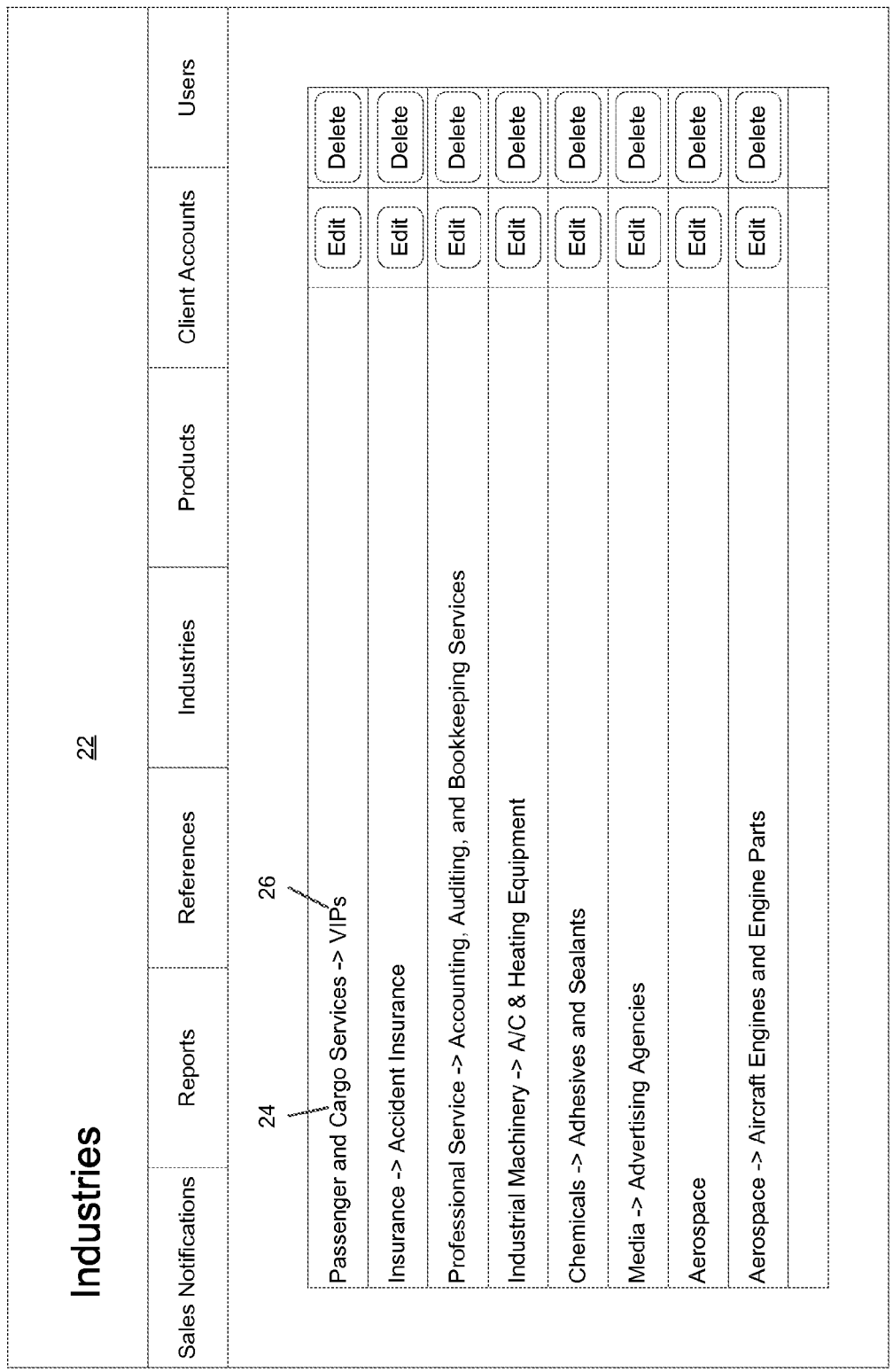
FIG. 3 is a view of a web page illustrating an industries summary page.

Referring to FIG. 3, an implementation of an industries summary page 22 is illustrated. As illustrated, the page includes a plurality of target industry identifiers 24, 26. As illustrated, the target industry identifiers may be organized within the database in a nested or hierarchal order with sub-industries located within parent industries. As illustrated, various editing options may be provided on the page 22 to allow the user to use the interface to enter, store, edit, and delete the target industry identifiers stored in the target industry database.

Referring to FIG. 4, an implementation of a products page 28 is illustrated. As illustrated, the products page 28 is configured to display one or more product identifiers 30 associated with a particular product or service and a product category 32 associated with each product identifier 30. In particular implementations, similar products and services may be assigned the same product category value 32. Any of a wide variety of products and services may be sold using implementations of the system 2, including, by non-limiting example, software, airplane components, paper, transportation services, any other product or service. Similarly to the target industry identifiers, the product identifiers, products, and product categories may be organized within the database in a nested or hierarchal order with sub-identifiers, sub-products, and/or sub-categories located within parent industries. As illustrated, various editing options may be provided on the page 28 to allow the user to use the interface to enter, store, edit, and delete the one or more product identifiers, products, and product categories stored in the product database.

Referring to FIG. 5, an implementation of a product editing page 34 is illustrated. As illustrated, the product editing page allows the user to enter and store the product category 36 associated with the product and enter one or more product identifiers 38. As illustrated, the user can also add collateral associated with the product by activating the Add Collateral button on the page. Collateral includes any material used to communicate information regarding the product, including, by non-limiting example, flyers, brochures, whitepapers, studies, price sheets, instructional videos, and any other material stored in computer readable form and capable of storage on the server 4. Through adding the collateral, the computer readable information associated with the collateral is stored on the server 4 and a link to the location of the computer readable information of the collateral may be stored in the product database. In particular implementations, the link may be a hyperlink. The methods implemented by the system in uploading and storing the collateral may be any of those disclosed in this document.

Referring to FIG. 6, an implementation of a client accounts summary page 40 is illustrated. As illustrated, the page 40 may include the name of each client, one or more industries associated with the client's business and any related companies (such as parent companies) associated with the client. Client accounts include both existing customer accounts and prospective customers, including recently added customers. Various buttons configured to allow the user to view, edit, store, and enter information into a client account database may be included on the page 40. Referring to FIG. 7, an implementation of a client account editing page 42 is illustrated. As illustrated, the client account editing page 42 permits storing, editing, and entering information for each client account into the client account database. In particularly implementations, the client account editing page 42 may permit manual and or automatic retrieval of client account information from various databases coupled to the system 2 so that it may be included in the client account database. As illustrated, the information includes a name of the client, an industry associated with the client's business and an account segment value 44 for the account segment in which the client is located. The account segment represents a classification of the client account into any of a wide variety of types of client accounts being handled by the company, including, by non-limiting example, new, existing, customer, net new/emerging, emerging, enterprise, volume, value, any other designation. In the implementation illustrated in FIG. 7, the account segment value 44 is equal to customer, indicating that the client account is an existing customer of the company. Many other additional fields could be included in implementations of the client account editing page 42 which allow the user to enter additional characteristics and values to be stored in the client account database for each client.

Referring to FIG. 8, a users summary page 46 is illustrated. As illustrated, the users summary page 46 displays information from a sales representative database that may include a name, email address, contact information, user type, and a date of last login to the sales notification system 2. In particular implementations of the system, only users of the system may be included in the sales representative database; in other implementations, all sales representatives may be included, whether or not they have a user account on the system 2. The user type may be used to indicate particular roles in the system 2 as well as indicate levels of access to data in the system 2. The Sales Representative role may be associated with sales representatives generally. Managers may be able to see the activities of Sales Representatives they supervise who are associated with them in the system. Approvers may review all sales notifications generated by the system and approve them before they are sent to sales representatives. For Approvers, whether any or all Approvers listed are required to approve a sales notification may be flexible and set by the author of a particular sales notification or other user of the system. Administrators may have the ability to edit and setup various system options. A wide variety of roles and access levels may be utilized in various implementations of the system 2. Upon pressing the Edit button next to each user, information relating to the user can be added, removed, or edited, including, by non-limiting example, the user's name, user contact information, a photo associated with the user, a user password, the identity of one or more client accounts associated with a particular user, or any other user identifying information and/or information associating the user with any other value or item of information stored in any database associated with the system 2.

In implementations of the system, information relating to a reference who purchased a particular product included in the product database may be included in a references database. Referring to FIG. 9, an implementation of a references summary page 48 is illustrated. As illustrated, the reference includes the name of a client account and a name of a particular product that was purchased by that client. The page 48 also includes options to permit a user to edit reference information or delete the reference from the references database. Referring to FIG. 10, an implementation of a references editing page 50 is illustrated. As illustrated, the page 50 enables the user to store, edit, enter, and change information relating to a particular reference that relates to a recent purchase of a product or service by a client account. Information included may be whether the reference will accept calls from prospective purchasers regarding their experience (reference calls), whether the product or service is current in service or currently being provided (live/planned/implementing), and the dollar amount of the sale, which may be expressed as a range in particular implementations. In addition, one or more items of information may be included that proved to be valuable in closing the sale for the sales representative who was successful. This may take the form of a sales approach, which may include any of a wide variety of pieces information regarding the customer, the product, or other sales strategy or market or business environment information that aided the sales representative in making the sale. This same information may be relevant to another potential purchaser.

As an aid in helping a sales representative have access to critical information regarding the transaction that the reference customer entered into and/or to assist the sales representative in sharing that information with the prospective customer, collateral relating to the reference may be uploaded in the form of computer readable information in any of the forms of collateral disclosed in this document. A sorting option may be used when multiple collateral items have been added to enable the user to determine which option will appear at the top of the list. Where video files are used, a time period may be specified to identify the time of the frame within the video which should be used as a video thumbnail to appear on an interface on a mobile computing device. In addition, whether the collateral contains confidential information that should be viewable only by the sales representative and company employees and not prospective or existing customers may be indicated through selection of a check box or other option. A name of the collateral and a description of the collateral may also be included through options on the page 50 as well, along with the option to add additional collateral through entering additional information and uploading additional computer readable information.

Referring to FIG. 11, an implementation of a sales notifications summary page 52 is illustrated. As illustrated, the page 52 has two different sales notifications available in the system 2. The first is named "Database Software Sale" and the second "Motors, Inc., Machinery." In the first column, the industries related to the sales notification are listed and in the second, the products related to the sales notification are identified. In the left hand column buttons or links are provided to allow a user to view, edit, or delete a particular sales notification. In particular implementations, additional buttons or links may be provided to allow a user to publish a sales notification, or send it out to system-identified sales representatives. Other buttons or links may also be provided on the page 52 to allow other users of the system to approve, disapprove, unpublish, withdraw, or otherwise change information in or a status of a sales notification in the system 2.

Referring to FIG. 12, a view of a first portion of a sales notification editing page 54 is illustrated. In various implementations of sales notifications, the author of a sales notification may be a product marketing person, a field marketing person, an industry marketing person, a sales operations persons, or the sales representative who completed a particular sale, or another user who has been delegated the responsibility. The originator of the sales notification may be the author, or may be the sales representative who closed the sale that prompted creation of the sales notification. In the implementation illustrated in FIG. 12, the target industry identifiers are mining, forest products, and aerospace and two product identifiers are being utilized, Database 1 Software, and Database 2 Software. Two references have been selected by the user to be included in the sales notification, Acme Mining, Inc., and Motors, Inc. The product category associated with the two product identifiers is "1." Product categories can be, by non-limiting example, a number, combination of numbers, a letter, any combination of letters, a character, any combination of characters, any combination of letters, numbers, and characters, or any other symbol or indicator capable for use in distinguishing one product type from another which is capable of being stored in the product database. The account segment associated with the sales notification is "customer." Any of the account segments disclosed in this document may be included in various implementations of sales notifications. Additional filtering information may be included in the sales notification as in aid in helping the system 2 determine whether a particular client account should be identified as one which could be approached by a sales representative to see if sale could be made. This information may include the number of employees in the company, the amount of yearly, quarterly revenue or revenue within a certain period of time, the relationship of the potential client account to the company (such as, by non-limiting example, prospective, new, current, former, customer of affiliated or acquired entity or any other relationship category). The combination of the two product identifiers and the selected target industry identifiers is utilized by the server 4 to generate a list of client accounts associated with the selected target industry identifiers. This process may be described as a filtering step. In particular implementations, additional filters, like the number of employees and revenue may be further employed to sharpen the focus on companies most likely to yield results if approached by a sales representative. Another filter that may be employed is whether a company owns any, all, or some of the particular products associated with the product identifiers selected for a particular sales notification. Since particular products may be best suited to customers who already have purchased and are using products sold by the company while other products may be best suited for prospective customers who have never purchased from the company, the ability to filter on customer relationship and/or products already purchased by a customer may be valuable. The product category value and the account segment value will be utilized in a subsequent sales representative routing step to be described later in this document.

Additional information to aid the sales representative in qualifying and closing a sale with a prospective client account may also included in the sales notification. As illustrated in FIG. 12, information regarding the reasons the company that bought the product or service did so may be included. Benefits it provided them may be listed. The roles of the buyers, or decision makers who will actually be authorizing the purchase of the product or service may be included. A summary of a sales approach that a sales representative could use to start the client account qualification process may also be described. As illustrated in FIG. 12, it may begin by suggesting questions for the sales representative to ask the prospect, proposes a first step that the sales representative meet with IT and business employees at the company to discuss their problems, and identifies people to involve in the solution and sales process within the company the sales representative is working for. By including this information in the sales notification, implementations of the system 2 may be able to have this immediately in front of the sales representative as he or she is preparing to make contact to attempt to begin the qualification process of a client account identified in the sales notification. This information may guide the sales representative along a proven, best known method approach that resulted in an actual sale of the product(s) that is the subject of the sales notification.

Referring to FIG. 13, a second portion of a sales notification editing page is illustrated. As illustrated, additional information intended to aid the sales representative approach the qualification of a client account identified in the sales notification may be included in the notification. For example, as illustrated, details of a webinar where the sales representative who made the sale of the product(s) that are the subject of the sales notification may be included. By viewing this webinar, the sales representative has the opportunity to learn firsthand from the representative who made the sale exactly what was done, what worked, what didn't work, and may have the opportunity to ask specific questions related to client accounts the sales representative is responsible for to get information that may be important to succeeding in selling the product(s) to these accounts. The sales notification may also include information relating to a link, which may be a hyperlink in particular implementations, to where video, audio, or a transcript of the webinar will be located on the server 4. Alternatively, a video or other computer readable file may be uploaded directly to the server 4 through the use of controls present on the page 54.

Additional aids included in the sales notification may be computer readable information that can be used by the system 2 to generate one or more emails for sending to one or more client accounts using the mobile computing device 12 associated with the sales representative receiving the sales notification (eligible sales representative). As illustrated, this may include a sample subject for the email and sample text to be included in the email. Also as illustrated, the sample text may include programming (such as the braces) that triggers the mobile computing device 12, server 4, or client computer 10 to pull information from various databases to be included in the sales notification at the time of publishing or at the time the email is generated. In addition, as illustrated, collateral relating to the client account, the product(s), and/or a reference(s) may be included in the sales notification through use of the controls displayed on the page 54. As with the references, a sort order and confidential status of the collateral, along with name and description information may be able to be included and stored with the sales notification.

Referring to FIG. 14, a view of a third portion of a sales notification editing page is illustrated. In this implementation, a second piece of collateral is included with the sales notification, with a sort value of 2, indicating it will be the second piece of collateral displayed on the mobile computing device 12 when the sales notification has been processed. This piece of collateral is not confidential, meaning that it is available to use with the client account. Additional pieces of collateral may be added using buttons or links on the page 54. The user may also list one or more approvers to the sales notification any one of which, a combination of which, or all, must review the content of the sales notification before it is pushed or made available to the sales representatives. In particular implementations, the approvers review the sales notification in the same or similar format as the sales representatives will on an interface on a mobile computing device associated with each approver. In some implementations, the sales notification may be made available to the sales representatives and simultaneously also circulated for approval. The approvers may be users identified as approvers, managers, or any other user of the system. In particular implementations, viewers of the sales notification may be identified. Viewers of the sales notification may not be sales representatives who were identified to have a client account for which the sales notification was initially relevant (i.e., their client account does not need the particular product, is in a different industry, or they are not eligible to sell that particular product to that client account in that particular account segment). However, the user setting up the sales notification may decide that these sales representatives, managers, or other users would be benefitted by seeing the sales notification, but only in a view state.

As illustrated in FIG. 14, various statuses may be indicated on the sales notification to indicate its development or progress toward distribution to eligible sales representatives and eventual closure. Saving and other options may also be included.

As was previously discussed, information in the sales notification is initially used to filter client accounts in the client account database to determine a list of client account that would have the highest probability, given the characteristics of the most recent product sale, of potentially qualifying as a buyer of the product sold. This may be referred to as a filtering step. In the routing step, with this list of client accounts, the system 2 uses the server 4 to generate a list of potential sales representatives who are currently assigned to or otherwise available to sell to those accounts. Referring to FIG. 16, a view of a company settings page 56 is illustrated. As illustrated, the company settings page 56 is intended to include values that are used by the sales company itself to aid in generating and distributing sales notifications. For example, the account segment indicates the values of account segment values currently used by the company to categorize its client accounts. The product category indicates the list of all possible values of product categories that are currently being used by the company to categorize its various product and service offerings. The sales representative type indicates one or more categories of sales representatives at the company, one or more of which may be assigned to a particular client account. The potential sales representatives are selected from the sales representative database by initially determining which are currently assigned to the list of client accounts identified in the filtering step. The routing step is completed by evaluating which of the potential sales representatives in the list is permitted to sell the product(s) that is the subject of the sales notification within the particular account segment associated with each client account. Each of the sales representatives that is permitted to sell is an eligible sales representative, or one eligible to make the sale, or play, that is the subject of the sales notification (or sales play). This process of evaluating the list of potential sales representatives may be done in many ways.

In the implementation illustrated in FIG. 16, two implementations of decision matrices are illustrated. In the decision matrix at the bottom of the page 56, the user is able to enter by hand the sales representative type permitted to sell a product in a given product category in a specific account segment. This can be done for each product category in each segment. As illustrated, one or more different types of sales representatives may be assigned, or permitted to sell, to a particular combination of product category values and account segment values. The page 56 may include controls that allow the user to add or remove product categories and account segments. The second implementation of a decision matrix is located above the first, and includes the same information as that displayed in the first decision matrix, except in a computer readable form capable of being processed by the server 4 during processing of a sales notification being published to the sales representatives. In various implementations, the two decision matrices may have the same values; in others, they may have different values and be used either exclusively, complementarily, or as verifications of each other. Once the decision matrix has been established using the company settings page 56, it is available for use during the routing step by the server 4 to determine the list of eligible sales representatives.

Referring to FIG. 26A, a third implementation of a decision matrix is illustrated on page 96, which is a company settings page. As illustrated, the decision matrix lists the account segments in rows and the product categories in columns and indicates the one or more different types of sales representatives assigned to a given account. The page 96 also includes the ability to set up the company name, an email address associated with a customer relationship management (CRM) manager for the company, and information relating to the month corresponding with the first fiscal quarter for the company. Referring to FIG. 26B, the implementation of the decision matrix is shown after one of the row/column cells has been selected by the user, which executes instructions that create a window in which the user can select which types of sales representatives are assigned to the given account segment and product category combination. In particular implementations, the type of sales representative may be a description or title of a sales representative have a particular skills set, training, certification, or job title within the company. In other implementations, the type of sales representative may correspond with the identity of a specific sales representative, i.e., the name of the sales representative. In this way, the author of the sales notification can select sales representatives by type and/or name, depending upon the way the sales representative types have been set up in the system 2. In addition, through use of functionality associated with the Add Rep button, the author can add a specific sales representative type not in the system or not in the list above or the name of one or more sales representatives who would be eligible to sell the product(s) associated with the sales notification within that account segment and product category combination. In this third decision matrix implementation, the values for the account segments and the values for the product categories may be entered by selecting the +New option, which adds an additional row to the decision matrix. Various drop down or other menus may be presented to allow the author to select from existing account segment values or product category values or to add new account segment value or product category values in particular implementations. In this way, the author can utilize a point and click interface to set up the decision matrix for a particular company. The system 2 then can generate the needed instructions to allow the server 4 and database 6 to have the routing logic needed to identify which sales representatives will be eligible for a given sales notification that is available for a given account segment value and product category.

Referring to FIG. 17, an implementation of an interface 58 on a screen of a mobile computing device implementation 12 is illustrated. As illustrated, the interface 58 contains information derived from a specific sales notification that has been received from the telecommunications channel 8 by the mobile computing device 12. The correspondence of much of the information on this screen and the information included in the sales notification implementation illustrated in FIGS. 12-14 can be noted by comparison. A sales notifications indicator is included in the interface, which may, in particular implementations, indicate the number of sales notifications currently routed to the eligible sales representative who has been determined should receive them. A title of the sales notification along with the information regarding the sales approach along with background information is included on the interface, including who the decision making buyers would be for this particular product. In the center of the interface is a section which may display a photo of the sales representative to close the sale of the product(s) which is the subject of the sales notification along with a button or link to display information on how to run the sale based on his or her experience. Information relating to the references included in the sales notification along with the size of the deals and identity of the client accounts referenced are included along the bottom of the interface 58, along with a button or link to select which will permit additional details of the reference to appear, including the ability to view collaterals associated with each reference. Collaterals associated with the product and/or the client account that was the subject of the sale are also made available on the interface. Where the interface is navigable using gestures, such as on an IPAD or IPHONE branded mobile computing system, various black and white indicators may appear below the collaterals associated with the product to allow the eligible sales representative to scroll through the sort order of the collaterals. In various interface implementations, the interface 58 is configured to permit the collateral, upon selection by the eligible sales representative, to occupy the entire area of the interface and display the content or play back the video or audio file associated with that collateral. A button or link may appear at the upper right of the interface 58 allowing the eligible sales representative to generate an email using the sample content in the sales notification. An additional button, link, or indicator may appear next to or coupled with the email indicator to show whether any attachments have been added to the email. A settings button, link, or indicator may appear on the interface 58 as well, which permits the eligible sales representative to make changes to the settings and appearance of the interface 58 generated by the mobile computing device 14.

Additional buttons, links, or indicators may be included in implementations of the interface 58 to enable a user to, by non-limiting example, execute specific tasks involved in interacting with system 2, launch or execute programs external to the interface 58 bringing up interfaces created by execution of those programs, make interfaces showing settings or controls associated with the mobile computing device, or any other function needed to allow the user to involve any program available on the mobile computing device with tasks or activities associated with the interface 58 and/or the system 2. For example, in particular implementations, a button may be included on the interface 58 that permits a note taking program to be launched (such as that marketed under the tradename EVERNOTE by Evernote Corporation of Mountain View, Calif., or that marketed under the tradename NOTESHELF marketed by Rama Krishna) and appear over a portion of the interface 58 or replace the interface 58. Any of a wide variety of other programs, applications, commands, or other instructions contained in computer readable form could be integrated within or executed via the interface 58.

Figure 19:
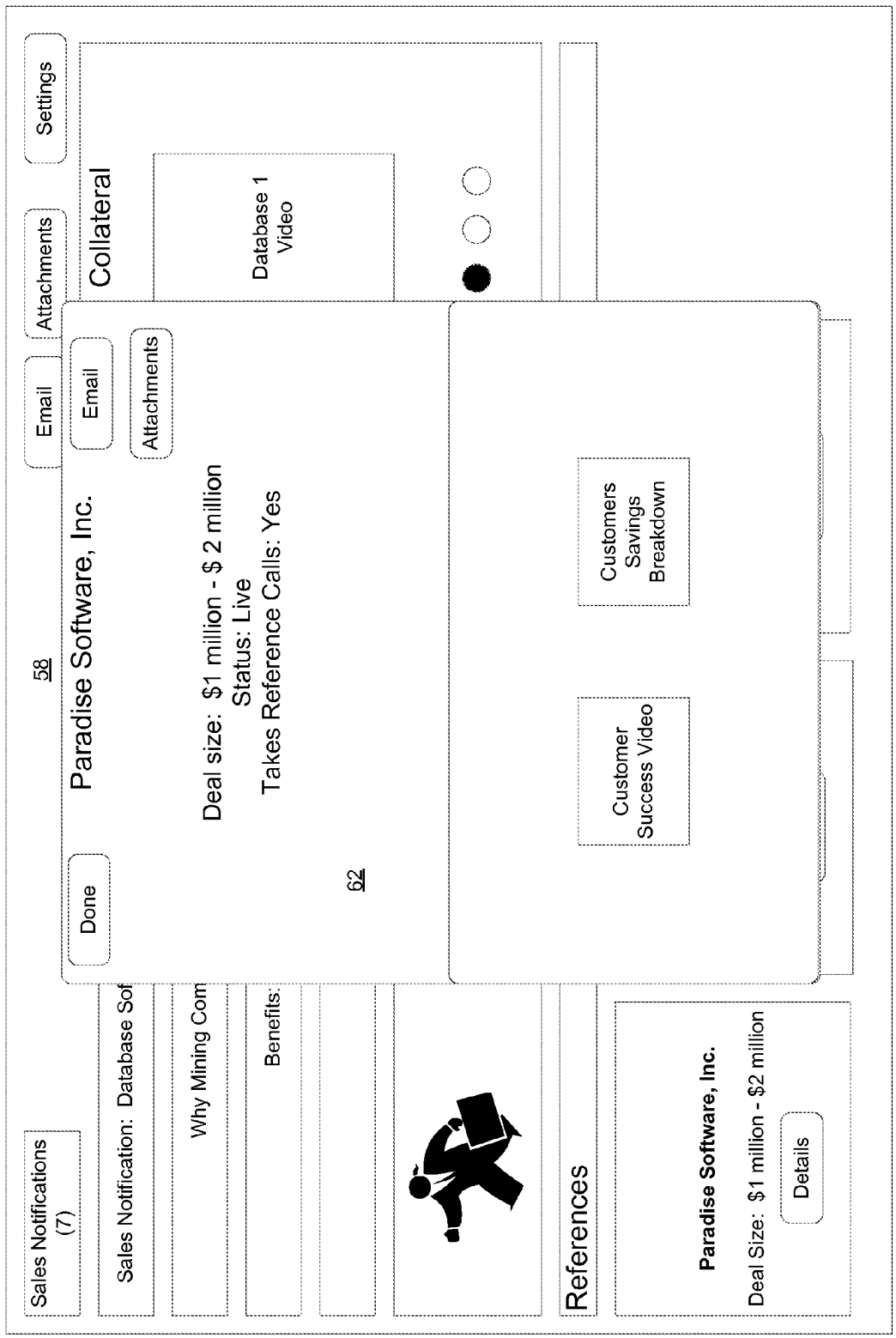
FIG. 19 is a view of a window displaying information relating to a reference included in the sales notification.

Referring to FIG. 18, the interface 58 is illustrated showing the window 60 that appears in response to pressing the button, link, or indicator in the section showing how to run the particular sale. As illustrated, this window includes the sales approach information included in the sales notification, as well the information regarding how to access the webinar. Controls to close out the window 60 are also included. Referring to FIG. 19, the interface 58 is illustrated showing the window 62 that is displayed in response to pressing the details button, link, or indicator for the reference included on the lower right hand corner of the interface 58. As illustrated, information regarding the deal size, status of the deal (live or in the planning/implementations stages), and whether the reference is willing to have prospective client accounts contact them for information is included. Also included are links to collaterals associated with each reference, which may include any collateral type. The collateral included in a sales notification may be downloaded to the mobile computing device 12 which may permit it be viewed with no internet or telecommunications channel available, may reside on the server 4, or may reside in both places and be accessible over the telecommunications channel 8. In some implementations, as illustrated, additional email and attachment buttons, links, or indicators may be included to access sample email content included in the sales notification and related to the particular reference.

Figure 20:
FIG. 20 is a view of a sample email created using the mobile computing device and information included in the sales notification.
Figure 21:
FIG. 21 is a view of a window displaying settings information relating to the computer interface being generated using the mobile computing device.

Referring to FIG. 20, the interface 58 is illustrated showing the email generated in response to pressing the email button, link, or indicator on the interface 58. The email text shown is that which was provided by the sales notification author and which was illustrated in FIG. 13. The sales representative is free to edit this text prior to sending the email. As can be seen, the email may contain prompting text to help the eligible sales representative customize the email before sending and may include links to the collaterals being attached to the email. In some implementations, the physical collateral computer readable files may be attached to the email; in others only links to the computer readable files on the server 4 may be included; in others, a combination of both may be used. Referring to FIG. 21, the interface 58 is illustrated showing the window 66 that opens in response to pressing the settings button, link, or indicator on the interface 58. As illustrated, various settings options relating to the interface 58 being generated on the mobile computing device 12 may be included. These include a button, switch, link, or other indicator that permits the interface 58 to be changed from displaying confidential information and collaterals to all information indicated as non-confidential which can be displayed to the prospective client account. Another option allows the eligible sales representative to login to the system 2 through the mobile computing device 12. Additional options that may be included may be, by non-limiting example, resetting a user's password, sending in a bug report to technical support, asking a question of technical support, deleting all pieces of collateral from off the mobile computing device 12, or any other user-centric, mobile computing device centric, or other function needed to aid the user in using the system 2.

In particular implementations of the system 2, the system 2 may have the ability to capture identifying information associated with an individual who downloaded, viewed, or otherwise access collateral included in or linked within the email. In some implementations, the identifying information may include an Internet Protocol (IP) address associated with the individual, the identity of their Internet Service Provider (ISP) or other organization controlling that IP address, the time of access/download/view, and a time the email was sent. Such information does not necessarily indicate that the person to whom the email was sent downloaded or viewed, but does indicate that some individual with the organization has begun the review process of the collateral. This information may greatly assist the sales representative in timing a follow up call or check up on the prospective customer.

Figure 22:
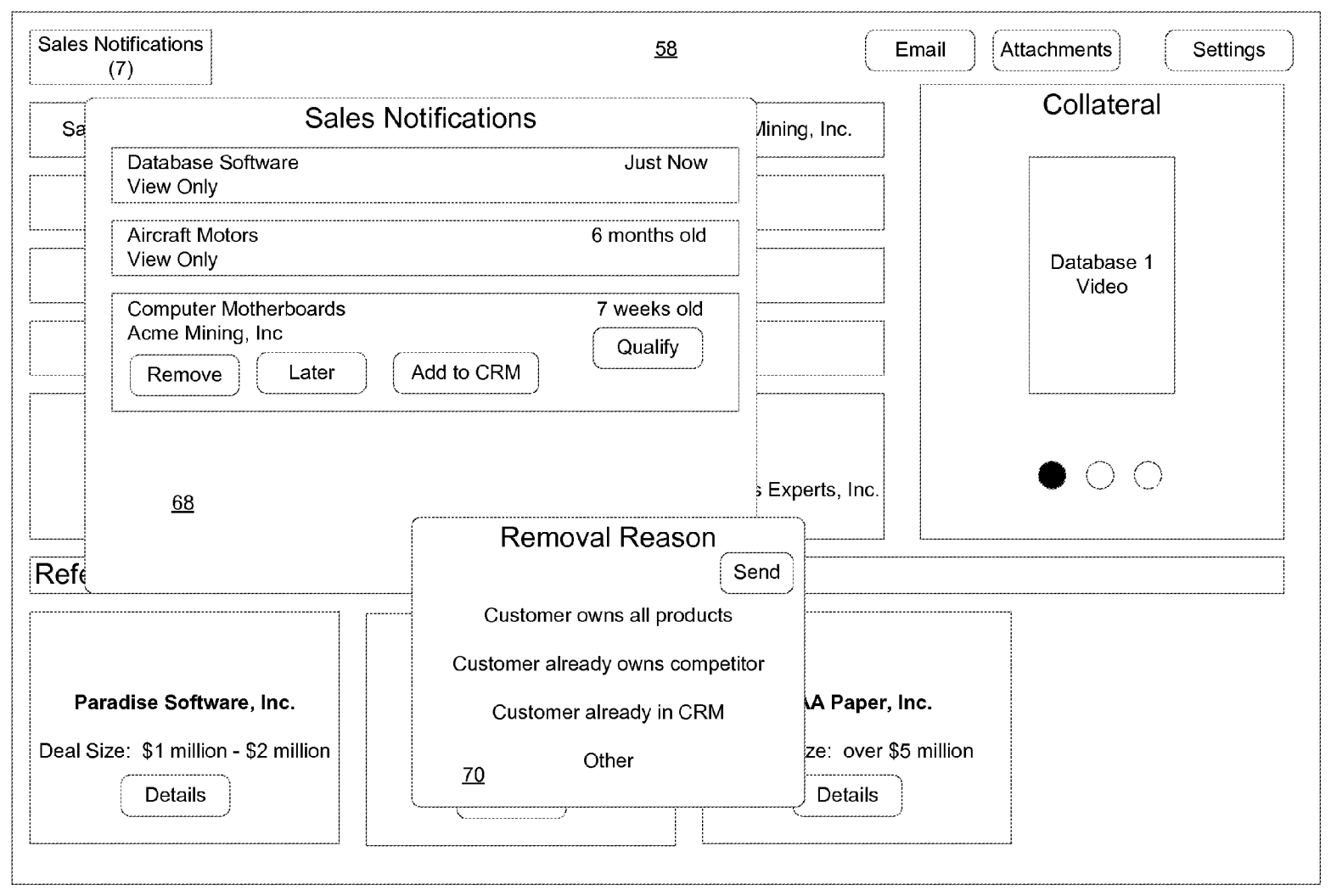
Figure 23:
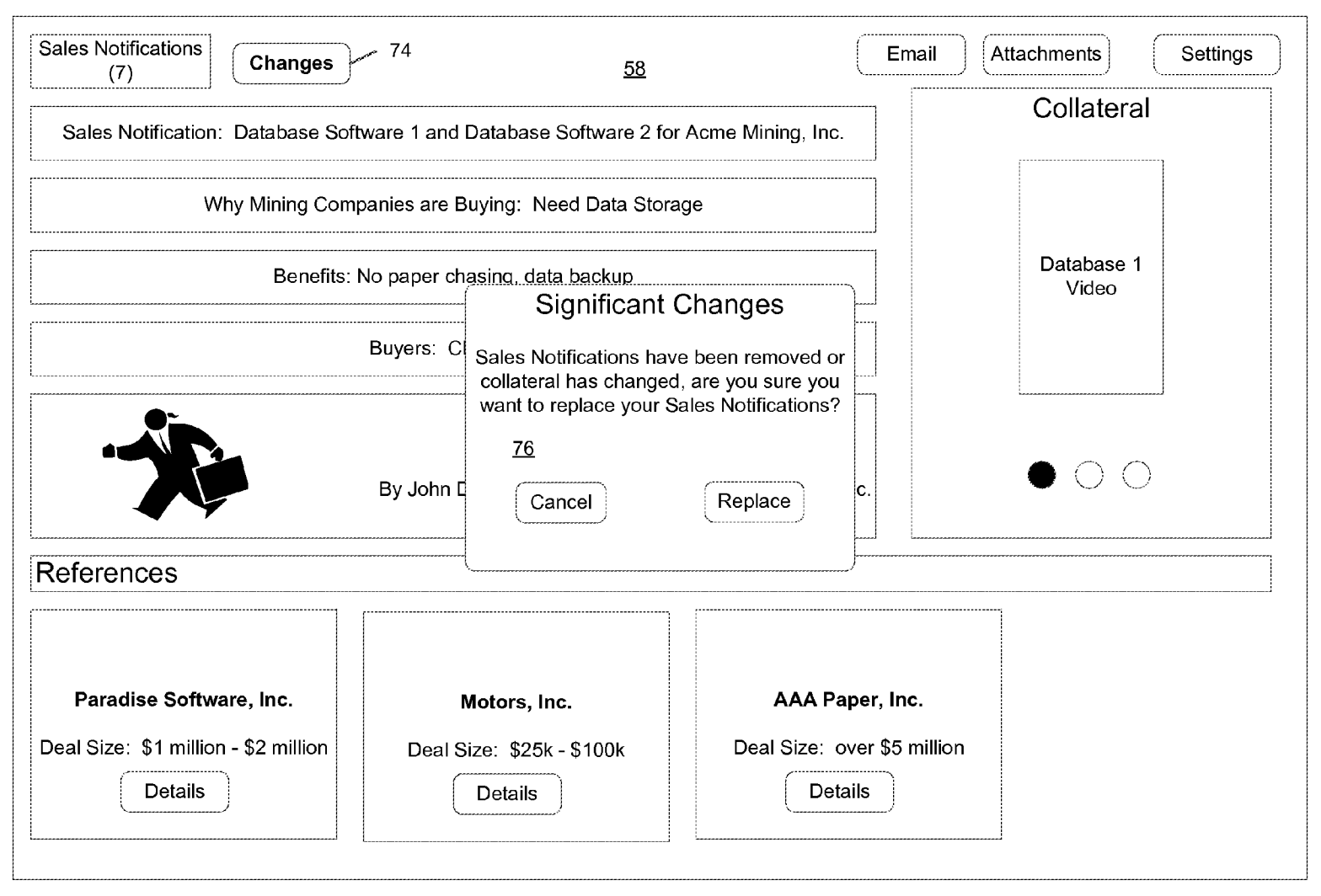

Referring to FIG. 22, the interface 58 is illustrated showing the window 68 that opens when the sales notifications indicator, button, link, or switch is activated. As illustrated, the window 68 lists the title, time of receipt of the sales notification by the eligible sales representative, and whether the sales notification is view only or one assigned for qualification by the eligible sales representative and targeted to a specific account held by that eligible sales representative. At the time a new sales notification is received, the mobile computing device 12 uses the information in the sales notification to generate a notification on the interface, which takes the form of a window similar in structural appearance to the notification implementation illustrated in FIG. 23 except that the text in the window indicates that the user has received a new sales notification for review. After the eligible sales representative acknowledges the notification, the sales notification is accessible through selecting the title or other button, link, or indicator associated with each sales notification in the in the window 68. When selected, the interface information changes to reflect the information associated with the newly selected sales notification. In particular implementations, the system 2 may send an email notification to an email address associated with the eligible sales representative as an additional reminder of the existence of the sales notification. In some implementations, no notification may be generated on the interface 58, but only an email notification may be sent to prompt the eligible sales representative to open the interface 58 and view the sales notification.

To disposition or qualify the various sales notifications, the eligible sales representative may click the qualify button, link, or indicator, or, in particular implementations, may directly press the Remove, Later, or Add to CRM buttons to choose a qualification option. In some implementations pressing the Qualify button will bring up the Remove, Later, or Add to CRM buttons and pressing the Qualify button again will hide these buttons. A window will appear in response to pressing each of these buttons. An implementation of the window 70 that appears when the Remove button is pressed is illustrated in FIG. 22. Here, reasons for removal are listed which can be selected by the eligible sales representative. Once one of these reasons has been selected and the Send button has been pressed, the mobile computing device 12 sends a response to the sales notification into the telecommunication channel 8 which is received by the server 4 and recorded. In cases where the Other reason is selected, various text entry fields may appear allowing the eligible sales representative to enter free text explaining a reason why the product(s) will not be bought by the client account associated with the sales notification. When the Later option is selected, a window giving various preset periods of time after which the sales notification should be retransmitted to the eligible sales representative. These may include a period of days, weeks, quarters, or another period of time. When the Add to CRM button is selected, a window with text fields that permits entry of the dollar amount of the sale of the product(s) associated with the sales notification is displayed, along with other information relevant to inclusion of the sale in a Customer Relationship Management (CRM) software application (a sales information communication response). In particular implementations, this may take the form of the future estimated close date divided by the monetary amount of the sale in a particular currency. This information may be regarded as a CRM Opportunity, which in particular industries may be subject to basic sales assumptions, such as that ⅓ of these type of opportunities actually close. In particular implementations, the information entered into the text and other fields may be directly posted to the CRM system; in others, the information may be sent to another system or individual who manually or semi-automatically enters the information into the CRM system. The use of these buttons permits the eligible sales representative to provide instantaneous feedback through the responses to the sales notification and storage of the responses in a response database coupled with the server 4.

Referring to FIG. 15, a view of a reports page 72 is illustrated. The reports page 72 illustrates an implementation of a qualification report, which takes information from the response database and other databases associated with the server to create report that includes the total number of sales notifications provided to each eligible sales representative, the number of responses (qualifications) received from each eligible sales representative, a number of removal responses, reminder responses, and sales information communication responses (CRM Opportunities) received from each sales representative. The report also includes the dollar impact of the sales added to CRM. By allowing the creation of this report and the feeding back of this information directly from the sales representatives, management can see in real time whether the sales representatives are using the system 2, the effectiveness of the information in, filtering, and routing operations of the sales notifications in the aggregate, and can identify individuals who are successfully using the system to be able to make a dollar impact. This ability to provide real-time feedback may provide significant performance management advantages and goal setting possibilities to management of the sales representatives.

In various implementations of the sales notification system 2, the collaterals associated with the references, products, or sales notifications themselves may be changed, altered, or deleted. In addition, entire sales notifications may be deleted or replaced. To ensure that sales representatives are properly notified of such changes prior to, for example, showing up at a client account site to present using the collaterals, the system may generate an alteration notification using the server 4 and send the alteration notification to the mobile computing device 12. In response to receiving the alteration notification, the mobile computing device 12 may display a redownload notification 74 on the interface 58 on the screen of the mobile computer device 12. When the redownload notification 74 appears, an additional window 76 may also appear notifying that significant changes to a sales notification have occurred. In some implementations, both may appear automatically. In others, the window 76 may appear only when the redownload notification 74 appears on the interface 58. If the sales representative opts to replace the collaterals by pressing the replace button, the altered information in computer readable form relating to any of the references, sales collateral, email content, or sales notification information itself will download or redownload from the server 4 across the telecommunication channel 8. If the sales representative opts not to replace the content, the original content will remain, which works to prevent surprises caused by invisible background content updating that could occur if the sales representative did not have control of the updating process.

Figure 24:
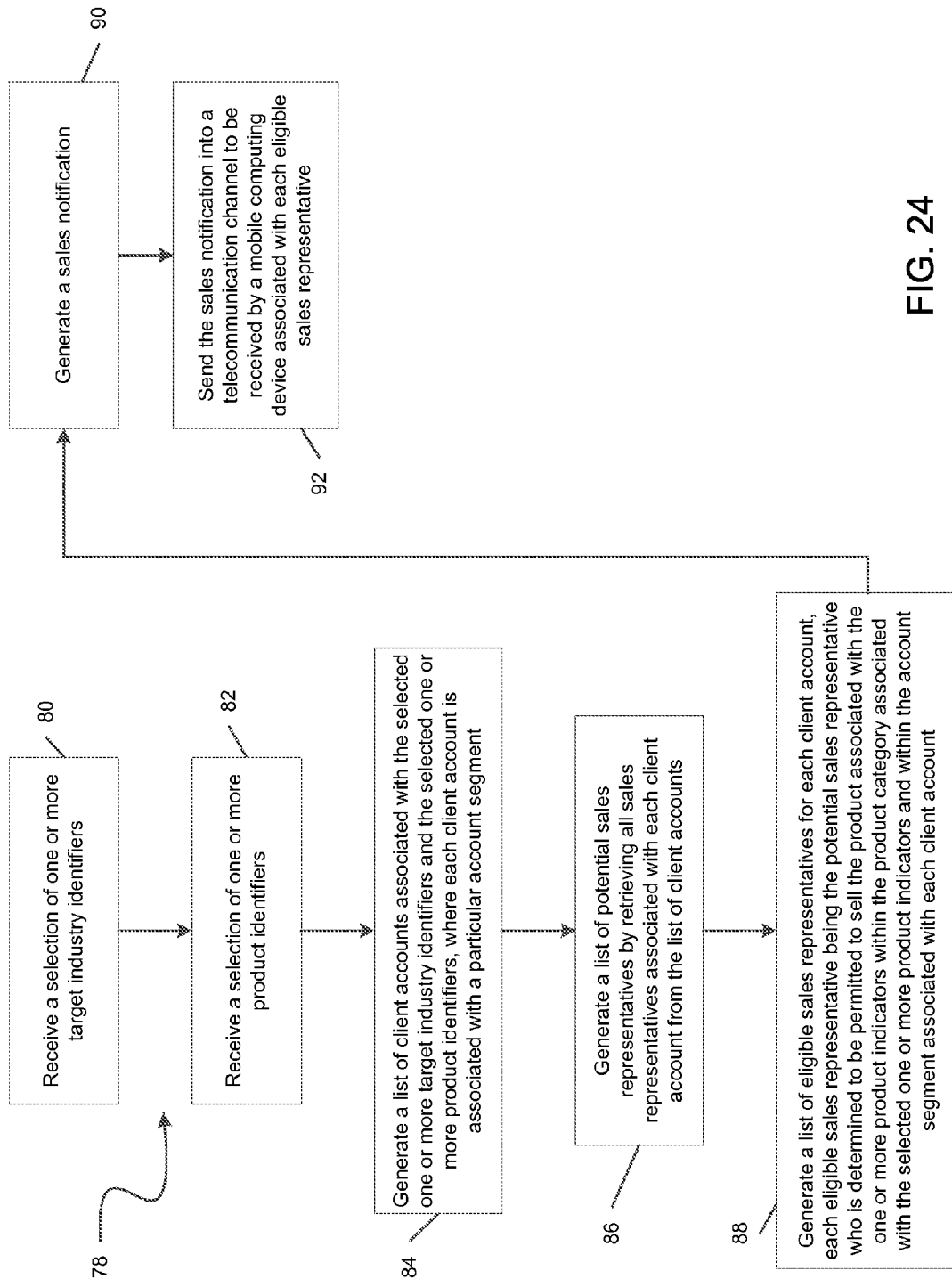
FIG. 24 is a flowchart of an implementation of a method of notifying a sales representative of a sales opportunity.

Implementations of sales notification systems 2 like those illustrated in this document may utilize a wide variety of methods of notifying a sales representative of a sales opportunity 78. Referring to FIG. 24, an implementation of such a method 78 is illustrated. The method includes receiving a selection of one or more target industry identifiers (step 80), receiving a selection of one or more product identifiers (step 82), generating a list of client accounts associated with the selected one or more target industry identifiers and the selected one or more product identifiers where each client account is associated with a particular account segment (step 84). The method further includes generating a list of potential sales representatives by retrieving all sales representatives associated with each client account from the list of client accounts (step 86) and generating a list of eligible sales representatives for each client account, each eligible sales representative being the potential sales representative who is determined to be permitted to sell the product associated with the one or more product indicators within the product category associated with the selected one or more product indicators and within the account segment associated with each client account (step 88). The method also includes generating a sales notification (step 90) and sending the sales notification into a telecommunication channel to be received by a mobile computing device associated with each eligible sales representative (step 92).

In various method implementations, the method may include generating an approval notification using the server 4 after a sales notification has been generated and sending the approval notification into the telecommunication channel 8, where it is received by a mobile computing device 14 associated with an approver. The mobile computing device 14 is configured to generate a notification similar to the other notifications disclosed in this document alerting the approver of the existence of need to approve and information relating to the sales notification on the screen of the mobile computing device 14. The approver then generates a return approval notification or rejection notification which may include comments relating to reasons for the rejection using the mobile computing device 14 which is then sent into the telecommunication channel 8 by the mobile computing device. The server 4 then receives and records the approval. In particular implementations, the method may further include distributing the sales notification to the various eligible sales representatives, or waiting until the author of the sales notification publishes the sales notification to the various eligible sales representatives.

Referring to FIG. 25, an interface 94 is illustrated. While interface 58 illustrated in FIGS. 17-23 has been created through execution of computer readable instructions by a mobile computing device 12, interface 94 is designed to be created through execution of computer readable instructions by a web browsing application, such as, by non-limiting example, INTERNET EXPLORER marketed by Microsoft Corporation of Redmond, Wash.; FIREFOX marketed by Mozilla Corporation of Mountain View, Calif.; CHROME marketed by Google, Inc. of Mountain View, Calif.; SAFARI marketed by Apple, Inc., of Cupertino, Calif.; or any other web browser type. Referring to FIG. 1, client computer 100 may be utilized by users who do not have access to mobile computing devices 12 and 14 to interact with the server 4 and database 6 through the telecommunications channel 8. Client computer 100 may be, by non-limiting example, a desktop, laptop, mobile computing device operating a web browser, smartphone, or any other computing device capable of operating a web browser. By inspection, the interface 94 contains the same information relating to a sales notification as the interface 58, though variations in the layout and functionality of buttons, links, and indicators are present consistent with the difference in functionality available in a web environment when compared with that available in a standalone computing environment. For example, the Sales Notifications Indicator has moved from the left to the right side of the screen, and when selected by a user will bring up a web browser pop up, dialog box, modal dialog box, or other window capable of execution by a web browser to list the existing sales notifications assigned to a particular eligible sales representative.

Referring to FIG. 27, an implementation of a Sales Notifications by Account reporting page 98 is illustrated. As illustrated, the page 98 permits a user, who may be a manager, author, approver, or any other user, to see a report of which sales notifications are associated with which customers or client accounts and to simultaneously see which sales representatives assigned to a particular account are eligible to sell the product to the account and who the system 2 has assigned as the contact person at the account who the eligible sales representative should contact. Such a report may be useful to the viewer in several ways. The first is that the representative can use the report to verify that the system 2 has assigned the particular sales notification to every client account or potential customer for whom the sales notification could be relevant. Secondly, the report allows the viewer to determine whether the proper sales representative has been identified by the system 2 to sell the particular product to that particular company. Thirdly, the report allows the viewer to capture trends across sales notifications. For example, CIO X has been identified by the authors of the Database SW, Aircraft Engines, Motherboards, and Bond Paper sales notifications as being the point of contact for these notifications, and sales representatives A, D, G, and P have accordingly been instructed to contact CIO X to begin the process of making the sale. However, it may be likely that having 4 different sales representatives contacting the same individual at the company may product various counterproductive results, including frustration and irritation and could damage the long-term relationship between the company and this particular current or prospective client account. Accordingly, in particular implementations, the report may permit the selection of a particular client account/sales notification cell and generate a window (as illustrated in FIG. 27) that permits the viewer of the report to manually add an additional representative or change the representative assigned and/or change the contact person at the client account identified as the contact person. Various drop down menus and other automatic data entry functions may be included in implementations of the window. Furthermore, in particular implementations, the page 98 may include functionality to allow the viewer to add additional client accounts to a particular sales notification (via adding a row to the report) or adding an additional sales notification to two or more client accounts (via adding a column to the report). A wide variety of functions may be enabled through interacting with the values in the cells of the report.

Implementations of the page 98 and the system 2 may utilize various implementations of manually associating a sales representative with a desired sales notification and/or manually associating a client account with a desires sales notification through use of the server 4 and/or database 6. In implementations of the method, the user may select a sales representative from a list of sales representatives or sales representative types associated with the company and then associate the selected sales representative with a sales notification following that selection. In implementations of the method, the user may also select a contact person at a client account from a list of contact people at a client account and then associate that contact person with the sales notification for that client account. In a similar way, the method may also include selecting a client account from a list of client accounts and associating that client account with a sales notification and vice versa. A wide variety of potential method implementations involving manual editing are possible using the principles disclosed herein.

In places where the description above refers to particular implementations of sales notification systems 2 and method implementations it should be readily apparent that a number of modifications may be made without departing from the spirit thereof and that these implementations may be applied to other sales notification system and method implementations.

What is claimed is:

1. A method of notifying a sales representative of a sales opportunity, the method comprising:

receiving, using a server, a selection of one or more target industry identifiers from a plurality of target industry identifiers comprised in a target industry database;

receiving, using the server, a selection of one or more product identifiers from a plurality of product identifiers comprised in a product database, each of the one or more product identifiers associated with a particular product and with a particular product category;

generating a list of client accounts associated with the selected one or more target industry identifiers and the selected one or more product identifiers from a client account database using the server operatively coupled with the target industry database, the product database, and a client account database, wherein each client account in the client account database is associated with a particular account segment;

generating a list of potential sales representatives using the list of client accounts and a sales representative database by retrieving all sales representatives associated with each client account in the list of client accounts from the sales representative database using the server;

using the server, generating a list of eligible sales representatives for each client account from the list of potential sales representatives, each eligible sales representative being the potential sales representative who is determined to be permitted to sell the product associated with the selected one or more product identifiers within the product category associated with the selected one or more product identifiers and within the account segment associated with each client account;

using the server, generating a sales notification for each eligible sales representative in the list of eligible sales representatives; and sending the sales notification for each eligible sales representative into a telecommunication channel using the server, each sales notification configured to be received from the telecommunication channel by a mobile computing device associated with each eligible sales representative, the mobile computing device configured to generate a notification on the screen of the mobile computing device using information comprised in the sales notification.

2. The method of claim 1, further comprising:

generating an approval notification using the server, the approval notification containing information relating to the sales notification;

sending the approval notification into the telecommunication channel, the approval notification configured to be received from the telecommunication channel by a mobile computing device associated with an approver, wherein the mobile computing device is configured to:

generate a notification on the screen of the mobile computing device in response to receiving the approval notification;

display information relating to the sales notification on the screen of the mobile computing device;

generate a return approval notification using the mobile computing device in response to the approver indicating an approval of the sales notification or a rejection of the sales notification; and send the return approval notification into the telecommunication channel, the return approval notification configured to be received from the telecommunication channel by the server; and recording the approval or rejection of the sales notification using the server in response to receipt of the return approval notification.

3. The method of claim 1, further comprising:

selecting one or more qualification options associated with the sales notification sent to each eligible sales representative using the mobile computing device;

generating one or more responses to each sales notification after selecting the one or more qualification options using the mobile computing device;

sending the one or more responses into the telecommunication channel using the mobile computing device; and receiving the one or more responses from the telecommunication channel using the server.

4. The method of claim 3, wherein selecting one or more qualification options by the eligible sales representative further comprises wherein the one or more responses are one of:

a removal response comprising information regarding the client account associated with the sales notification indicating a reason why the client account does not qualify for a sale of the product associated with the sales notification;

a reminder response comprising a time period when the sales notification should again be transmitted to the eligible sales representative for qualification;

a sales information communication response comprising information relating to a sale of the product forecasted by the eligible sales representative who received the sales notification.

5. The method of claim 4, further comprising:

storing one or more responses to each sales notification in a response database; and generating a report using the server and the response database wherein the report comprises a total number of sales notifications provided to a sales representative, a number of responses received from the sales representative, a number of removal responses received from the sales representative, a number of reminder responses received from the sales representative, and the number of sales information communication responses received from the sales representative.

6. The method of claim 1, wherein generating a sales notification further comprises wherein the sales notification comprises information regarding the client account and the product associated with the one or more product identifiers selected.

7. The method of claim 6, wherein generating a sales notification further comprises wherein the sales notification comprises:

identifying information of a sales representative who has completed a sale of the product to a client account;

information in computer readable form relating to one or more references;

sales collateral comprised in computer readable form;

information relating to a webinar being held by the sales representative who completed the sale;

information regarding a strategy for use by the eligible sales representative to sell to the client account associated with the sales notification; and content in computer readable form for generating one or more emails for sending to the client account using the mobile computing device associated with the eligible sales representative;

wherein the one or more emails are configured to include one of one or more hyperlinks to one or more locations of the sales collateral in computer readable form on the server, one or more hyperlinks to the information in computer readable form relating to the one or more references, and any combination thereof.

8. The method of claim 1, wherein generating the list of eligible sales representatives for each client account from the list of potential sales representatives, each eligible sales representative being the potential sales representative who is determined to be permitted to sell the product further comprises:

using the server and a decision matrix formed from values of the product categories associated with the one or more product identifiers and values of the account segment associated with the client accounts in the list of client accounts to make a decision whether each potential sales representative is an eligible sales representative.

9. The method of claim 1, wherein generating the list of eligible sales representatives for each client account from the list of potential sales representatives, each eligible sales representative being the potential sales representative who is determined to be permitted to sell the product further comprises:

generating a decision matrix by mapping values of the product categories associated with the one or more product identifiers to values of the account segment associated with each client account in the list of client accounts;

assigning to each mapped combination of product category values and account segment values a value of an eligible sales representative type allowed to sell the product for that mapped combination;

using the server, comparing a value of a eligible sales representative type associated with each potential sales representative in the list of potential sales representatives with a value of the eligible sales representative type assigned to each mapped combination; and where the value of the eligible sales representative type associated with a potential sales representative corresponds with the value of the eligible sales representative type assigned to a mapped combination, adding the potential sales representative to the list of eligible sales representatives.

10. A method of notifying a sales representative of a sales opportunity, the method comprising:

storing one or more target industry identifiers in a target industry database using a server;

storing one or more product identifiers for one or more products in a product database using the server, the one or more product identifiers associated with a particular product, with a product category, and with a collateral association configured to permit access by the server to sales collateral comprised in computer readable form related to the particular product;

storing a plurality of client accounts in a client account database using the server, each client account being associated with an account segment and comprising client identifying information including one of a number of employees, a relationship code, a yearly revenue, and any combination thereof;

storing a plurality of references in a references database using the server, each reference associated with a particular product and comprising information regarding a completed sale of the product to a particular client account including an amount of the sale, identifying information of the reference, a reference association configured to permit access by the server to reference collateral comprised in computer readable form related to the particular reference, and any combination thereof;

generating a sales notification by:

receiving a selection of one or more target industry identifiers from the plurality of target industry identifiers comprised in the target industry database;

receiving a selection of one or more product identifiers from the plurality of product identifiers comprised in the product database;

generating a list of client accounts associated with the selected one or more target industry identifiers and the selected one or more product identifiers from the client account database using the server operatively coupled with the target industry database, the product database, and the client account database;

generating a list of potential sales representatives using the list of client accounts and a sales representative database coupled to the server by retrieving all sales representatives associated with each client account in the list of client accounts from the sales representative database;

using the server, generating a list of eligible sales representatives for each client account from the list of potential sales representatives, each eligible sales representative being the potential sales representative who is determined to be permitted to sell the product associated with the selected one or more product identifiers within the product category associated with the selected one or more product identifiers and within the account segment associated with each client account;

receiving a selection of one or more references from the plurality of references comprised in the references database; and for each client account, configuring the sales notification to include information relating to the one or more product identifiers selected, the one or more references selected, and the client account; and using the server, sending a sales notification for each eligible sales representative into a telecommunication channel, each sales notification configured to be received from the telecommunication channel by a mobile computing device associated with each eligible sales representative, the mobile computing device configured to generate a notification on the screen of the mobile computing device using information comprised in the sales notification in response to receiving the sales notification.

11. The method of claim 10, further comprising:

generating an approval notification using the server, the approval notification containing information relating to the sales notification;

sending the approval notification into the telecommunication channel, the approval notification configured to be received from the telecommunication channel by a mobile computing device associated with an approver, wherein the mobile computing device is configured to:

generate a notification on the screen of the mobile computing device in response to receiving the approval notification;

display information relating to the sales notification on the screen of the mobile computing device;

generate a return approval notification using the mobile computing device in response to the approver indicating an approval or rejection of the sales notification; and send the return approval notification into the telecommunication channel, the return approval notification configured to be received from the telecommunication channel by the server; and recording the approval or rejection of the sales notification using the server in response to receipt of the return approval notification;

wherein recording the approval of the sales notification occurs prior to sending a sales notification for each eligible sales representative into a telecommunication channel.

12. The method of claim 10, further comprising:

selecting one or more qualification options associated with the sales notification sent to each eligible sales representative using the mobile computing device;

generating one or more responses to each sales notification after selecting the one or more qualification options using the mobile computing device;

sending the one or more responses into the telecommunication channel using the mobile computing device; and receiving the one or more responses from the telecommunication channel using the server.

13. The method of claim 12, wherein selecting one or more qualification options by the eligible sales representative further comprises wherein the one or more responses are one of:

a removal response comprising information regarding the client account associated with the sales notification indicating a reason why the client account does not qualify for a sale of the product associated with the sales notification;

a reminder response comprising a time period when the sales notification should again be transmitted to the eligible sales representative for qualification;

a sales information communication response comprising information relating to a sale of the product completed by the eligible sales representative who received the sales notification.

14. The method of claim 13, further comprising:

storing one or more responses to each sales notification in a response database; and generating a report using the server and the response database wherein the report comprises a total number of sales notifications provided to a sales representative, a number of responses received from the sales representative, a number of removal responses received from the sales representative, a number of reminder responses received from the sales representative, and the number of sales information communication responses received from the sales representative.

15. A method of qualifying sales opportunities from a sales notification, the method comprising:

receiving the sales notification from a telecommunication channel using a mobile computing device associated with an eligible sales representative;

generating a notification on the screen of the mobile computing device using information comprised in the sales notification in response to receiving the sales notification;

in response to activating the notification, displaying an interface on the screen of the mobile computing device configured to include:

identifying information of a sales representative who has completed a sale of a product to a client account;

information in computer readable form relating to one or more references; and sales collateral comprised in computer readable form; and selecting one or more qualification options comprised in the interface on the screen associated with the sales notification sent to the eligible sales representative using the mobile computing device;

generating one or more responses to the sales notification after selecting the one or more qualification options using the mobile computing device;

sending the one or more responses into the telecommunication channel using the mobile computing device; and receiving the one or more responses from the telecommunication channel using a server coupled with the mobile computing device through the telecommunication channel.

16. The method of claim 15, wherein displaying the interface on the screen of the mobile computing device is further configured to include displaying:

information relating to a webinar being held by the sales representative who completed the sale;

information regarding a strategy for use by the eligible sales representative to qualify the client account associated with the sales notification; and content in computer readable form for generating one or more emails for sending to the client account using the mobile computing device associated with the eligible sales representative;

wherein the one or more emails are configured to include one of one or more hyperlinks to one or more locations of the sales collateral in computer readable form on the server, one or more hyperlinks to the information in computer readable form relating to the one or more references, and any combination thereof.

17. The method of claim 16, further comprising:

downloading the information in computer readable form relating to the one or more references, the sales collateral, and the content in computer readable form for generating one or more emails, from the server across the telecommunication channel using the mobile computing device.

18. The method of claim 17, further comprising:

altering one of the information in computer readable form relating to the one or more references, the sales collateral, the content in computer readable form for generating one or more emails, and any combination thereof stored on the server;

generating an alteration notification using the server and sending the alteration notification into the telecommunication channel;

receiving the alteration notification from the telecommunication channel using the mobile computing device;

generating a redownload notification on the screen of the mobile computing device in response to receiving the alteration notification; and redownloading any one of the altered information in computer readable form relating to the one or more references, the sales collateral, the content in computer readable form for generating one or more emails, and any combination thereof stored on the server in response to the eligible sales representative activating the redownload notification on the screen.

19. The method of claim 15, wherein selecting the one or more qualification options further comprises wherein the one or more responses are one of:
- a removal response comprising information regarding the client account associated with the sales notification indicating a reason why the client account does not qualify for a sale of the product associated with the sales notification;
- a reminder response comprising a time period when the sales notification should again be transmitted to the eligible sales representative for qualification; and
- a sales information communication response comprising information relating to a sale of the product completed by the eligible sales representative who received the sales notification.

20. The method of claim 19, further comprising:
- storing one or more responses to the sales notification in a response database on the server; and
- generating a report using the server and the response database and displaying the report on a computer terminal coupled to the server wherein the report comprises a total number of sales notifications provided to a sales representative, a number of responses received from the sales representative, a number of removal responses received from the sales representative, a number of reminder responses received from the sales representative, and the number of sales information communication responses received from the sales representative.

* * * * *

UNITED STATES PATENT AND TRADEMARK OFFICE
CERTIFICATE OF CORRECTION

| | | |
|---|---|---|
| PATENT NO. | : 8,352,301 B1 | Page 1 of 1 |
| APPLICATION NO. | : 13/444761 | |
| DATED | : January 8, 2013 | |
| INVENTOR(S) | : Jeffrey H. Starr | |

It is certified that error appears in the above-identified patent and that said Letters Patent is hereby corrected as shown below:

Column 19, line 23, cancel the text "sales notification in the in the window" and insert --sales notification in the window--

Column 22, line 33, cancel the text "may product various" and insert --may produce various--

Column 22, line 55, cancel the text "account with a desires sales" and insert --account with a desired sales--

Signed and Sealed this
Fifth Day of March, 2013

Teresa Stanek Rea
*Acting Director of the United States Patent and Trademark Office*